United States Patent
MacInnis et al.

(10) Patent No.: US 8,503,812 B2
(45) Date of Patent: *Aug. 6, 2013

(54) METHOD AND SYSTEM FOR MOTION COMPENSATED TEMPORAL FILTERING USING BOTH FIR AND IIR FILTERING

(75) Inventors: Alexander MacInnis, Ann Arbor, MI (US); Sheng Zhong, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 12/963,173

(22) Filed: Dec. 8, 2010

(65) Prior Publication Data

US 2011/0075035 A1 Mar. 31, 2011

Related U.S. Application Data

(63) Continuation of application No. 11/619,431, filed on Jan. 3, 2007, now Pat. No. 7,865,030.

(60) Provisional application No. 60/844,216, filed on Sep. 13, 2006.

(51) Int. Cl.
*G06K 9/40* (2006.01)
*H04N 9/74* (2006.01)

(52) U.S. Cl.
USPC .......................................... 382/260; 348/584

(58) Field of Classification Search
USPC .......... 382/260, 236, 264, 162, 167; 348/607, 348/699–701, 451, 452, 597, 620; 375/240.16, 375/240.29
See application file for complete search history.

(56) References Cited

U.S. PATENT DOCUMENTS

| 5,608,464 | A | 3/1997 | Woodham |
| 6,298,090 | B1 * | 10/2001 | Challapali et al. ........ 375/240.29 |
| 6,437,787 | B1 | 8/2002 | Wu |
| 6,970,507 | B1 | 11/2005 | Musmann et al. |
| 7,567,724 | B2 * | 7/2009 | Gomi et al. .................... 382/261 |
| 7,573,530 | B2 | 8/2009 | Zhong |
| 7,764,740 | B2 * | 7/2010 | Seok et al. ............... 375/240.16 |
| 2003/0035583 | A1 * | 2/2003 | Pelagotti et al. .............. 382/217 |
| 2004/0028134 | A1 * | 2/2004 | Subramaniyan et al. 375/240.16 |
| 2004/0057517 | A1 * | 3/2004 | Wells ....................... 375/240.16 |
| 2004/0170333 | A1 * | 9/2004 | Toivonen et al. ............. 382/236 |
| 2005/0249293 | A1 * | 11/2005 | Zeng et al. ............... 375/240.29 |
| 2007/0014368 | A1 | 1/2007 | MacInnis et al. |
| 2007/0104269 | A1 * | 5/2007 | Xue et al. ................ 375/240.03 |
| 2008/0055477 | A1 * | 3/2008 | Wu et al. ....................... 348/620 |

* cited by examiner

*Primary Examiner* — Yon Couso
(74) *Attorney, Agent, or Firm* — Thomas | Horstemeyer, LLP

(57) ABSTRACT

Certain aspects of a method and system for motion compensated temporal filtering using both finite impulse response (FIR) and infinite impulse response (IIR) filtering may include blending at least one finite impulse response (FIR) filtered output picture of video data and at least one infinite impulse response (IIR) filtered output picture of video data to generate at least one blended non-motion compensated output picture of video data. A motion compensated picture of video data may be generated utilizing at least one previously generated output picture of video data and at least one current input picture of video data. A motion compensated picture of video data may be blended with at least one current input picture of video data to generate a motion compensated output picture of video data. The generated motion compensated output picture of video data and the generated non-motion compensated output picture of video data may be blended to generate at least one current output picture of video data.

20 Claims, 23 Drawing Sheets

METHOD AND SYSTEM FOR MOTION COMPENSATED TEMPORAL FILTERING USING BOTH FIR AND IIR FILTERING

CROSS-REFERENCE TO RELATED APPLICATIONS/INCORPORATION BY REFERENCE

This patent application is a continuation of U.S. application Ser. No. 11/619,431 filed Jan. 3, 2007, which application makes reference to, claims priority to and claims benefit from U.S. Provisional Patent Application Ser. No. 60/844,216 filed Sep. 13, 2006.

This application makes reference to:
U.S. application Ser. No. 11/314,679 filed Dec. 20, 2005, now U.S. Pat. No. 7,639,309 issued Dec. 29, 2009;
U.S. application Ser. No. 11/313,592 filed Dec. 20, 2005; and
U.S. application Ser. No. 11/619,444 filed Jan. 3, 2007.

Each of the above stated applications is hereby incorporated by reference in its entirety.

FIELD OF THE INVENTION

Certain embodiments of the invention relate to processing of video signals. More specifically, certain embodiments of the invention relate to a method and system for motion compensated temporal filtering using both finite impulse response (FIR) and infinite impulse response (IIR) filtering.

BACKGROUND OF THE INVENTION

In video system applications, random noise present in video signals, such as NTSC or PAL signals, for example, may result in images that are less than visually pleasing to the viewer. Noise may also be present in digital video signals. Noise in video signals may adversely affect encoding of the video. To address this problem, noise reduction (NR) operations may be utilized to remove or mitigate the noise present. Traditional NR operations may use either infinite impulse response (IIR) filtering based methods or finite impulse response (FIR) filtering based methods. IIR filtering may be utilized to significantly attenuate high frequency noise. However, IIR filtering may result in visual artifacts such as motion trails, jittering, and/or wobbling at places where there is object motion when the amount of filtering is not sufficiently conservative. In some instances, setting the IIR filtering conservatively may mitigate the noise removing capability even for places where there is little or no motion, such as a static area in video. As a result, there may be many instances where objectionable noise artifacts remain in the video signal.

Another traditional NR operation may be FIR filtering based methods. FIR filtering may not be subject to artifacts such as motion trail, motion blurring, jittering and/or wobbling, for example, as much as IIR-based filtering may be. FIR filtering may provide acceptable perceptual quality for moving areas to most viewers. However, in a practical NR system, which may not be able to employ a large number of video images to perform FIR filtering as a result of the cost of storage, the system's noise reducing capability may be very limited in those areas where there is little or no motion.

In order to improve the NR effectiveness it may be necessary to achieve both significant NR in areas of little or no motion and be free of motion artifacts such as motion trails, motion blur, jittering or wobbling in areas where there is motion.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for motion compensated temporal filtering algorithm using both finite impulse response (FIR) and infinite impulse response (IIR) filtering, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for motion compensated temporal filtering using both finite impulse response (FIR) and infinite impulse response (IIR) filtering. Certain aspects of a method may include blending at least one finite impulse response (FIR) filtered output picture of video data and at least one infinite impulse response (IIR) filtered output picture of video data to generate at least one blended non-motion compensated output picture of video data. A motion compensated picture of video data may be generated utilizing at least one previously generated output picture of video data and at least one current input picture of video data. A motion compensated picture of video data may be blended with at least one current input picture of video data to generate a motion compensated output picture of video data. The generated motion compensated output picture of video data and the generated non-motion compensated output picture of video data may be blended to generate at least one current output picture of video data.

Figure 1:
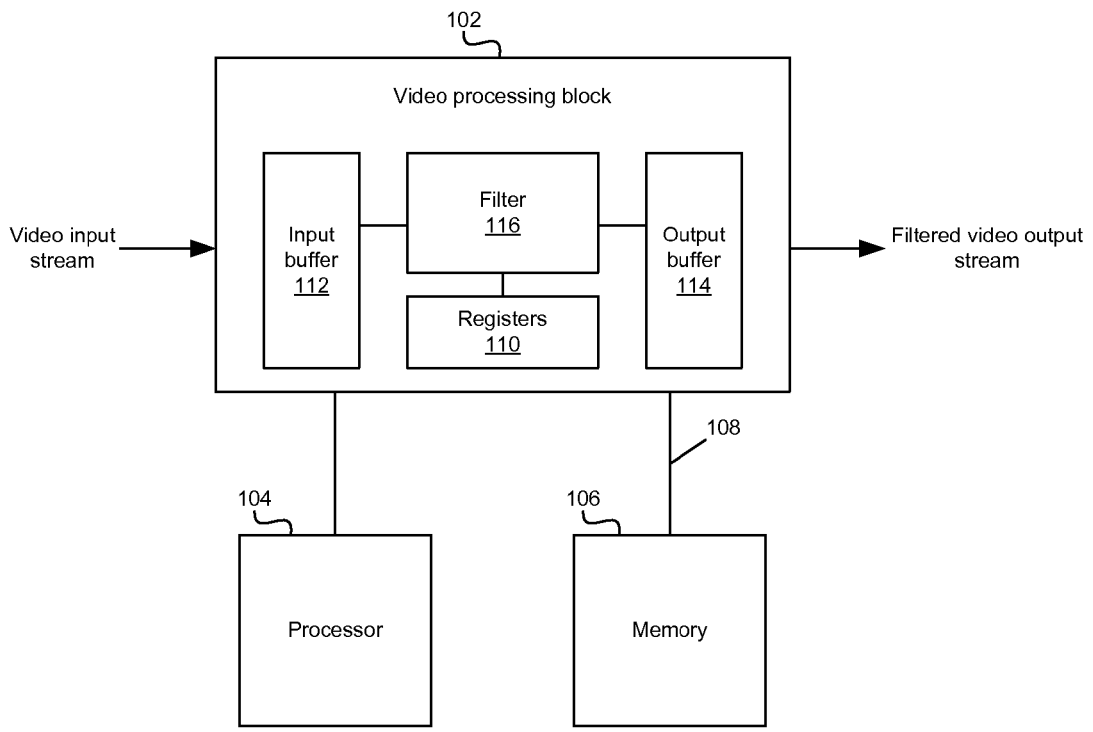
FIG. 1 is a block diagram of an exemplary video noise reduction system, in accordance with an embodiment of the invention.

FIG. 1 is a block diagram of an exemplary video noise reduction system, in accordance with an embodiment of the invention. Referring to FIG. 1, there is shown a video processing block 102, a processor 104, a memory 106, and a data/control bus 108. The video processing block 102 may comprise registers 110 and filter 116. In some instances, the video processing block 102 may also comprise an input buffer 112 and/or an output buffer 114. The video processing block 102 may comprise suitable logic, circuitry, and/or code that may be enabled to filter pixels in a video picture from a video input stream to reduce noise. For example, video frame pictures may be utilized in video systems with progressive video signals while video field pictures may be utilized in video systems with interlaced video signals. Video fields may alternate parity between top fields and bottom fields. A top field and a bottom field in an interlaced system may be deinterlaced or combined to produce a video frame.

The video processing block 102 may be enabled to receive a video input stream and, in some instances, to buffer at least a portion of the received video input stream in the input buffer 112. In this regard, the input buffer 112 may comprise suitable logic, circuitry, and/or code that may be enabled to store at least a portion of the received video input stream. Similarly, the video processing block 102 may be enabled to generate a filtered video output stream and, in some instances, to buffer at least a portion of the generated filtered video output stream in the output buffer 114. In this regard, the output buffer 114 may comprise suitable logic, circuitry, and/or code that may be enabled to store at least a portion of the filtered video output stream.

The filter 116 in the video processing block 102 may comprise suitable logic, circuitry, and/or code that may be enabled to perform an FIR filtering operation with noise reduction (FIR-NR) on a current pixel in a video picture, to perform an IIR filtering operation with noise reduction (IIR-NR) on the current pixel, or to perform an FIR-IIR blended filtering operation with noise reduction (FIR-IIR-NR) on the current pixel. In this regard, the filter 116 may be enabled to operate in a plurality of filtering modes, where each filtering mode may be associated with one of a plurality of supported filtering operations. The filter 116 may utilize video content, filter coefficients, threshold levels, and/or constants to generate the filtered video output stream in accordance with the filtering mode selected. In this regard, the video processing block 102 may generate blending factors to be utilized with the appropriate filtering mode selected. The registers 110 in the video processing block 102 may comprise suitable logic, circuitry, and/or code that may be enabled to store information that corresponds to filter coefficients, threshold levels, and/or constants, for example. Moreover, the registers 110 may be enabled to store information that correspond to a selected filtering mode.

The processor 104 may comprise suitable logic, circuitry, and/or code that may be enabled to process data and/or perform system control operations. The processor 104 may be enabled to control at least a portion of the operations of the video processing block 102. For example, the processor 104 may generate at least one signal to control the selection of the filtering mode in the video processing block 102. Moreover, the processor 104 may be enabled to program, update, and/or modify filter coefficients, threshold levels, and/or constants in at least a portion of the registers 110. For example, the processor 104 may generate at least one signal to retrieve stored filter coefficients, threshold levels, and/or constants that may be stored in the memory 106 and transfer the retrieved information to the registers 110 via the data/control bus 108. The memory 106 may comprise suitable logic, circuitry, and/or code that may be enabled to store information that may be utilized by the video processing block 102 to reduce noise in the video input stream. The processor 104 may also be enabled to determine noise levels for a current video picture based on an early-exit algorithm (EEA) or an interpolation estimate algorithm (IEA), for example. The memory 106 may be enabled to store filter coefficients, threshold levels, and/or constants, for example, to be utilized by the video processing block 102. U.S. application Ser. No. 11/313,592 filed Dec. 20, 2005, provides a detailed description of the early-exit algorithm (EEA) and the interpolation estimate algorithm (IEA), and is hereby incorporated by reference in its entirety.

In operation, the processor 104 may select a filtering mode of operation and may program the selected filtering mode into the registers 110 in the video processing block 102. Moreover, the processor 104 may program the appropriate values for the filter coefficients, threshold levels, and/or constants into the registers 110 in accordance with the selected filtering mode. The video processing block 102 may receive the video input stream and may filter pixels in a video picture in accordance with the selected filtering mode. In some instances, the video input stream may be stored in the input buffer 112 before processing. The video processing block 102 may generate the appropriate blending factors needed to perform the noise reduction filtering operation selected by the processor 104. The video processing block 102 may generate the filtered video output stream after performing the noise reduction filtering operation. In some instances, the filtered video output stream may be stored in the output buffer 114 before being transferred out of the video processing block 102.

Figure 2:
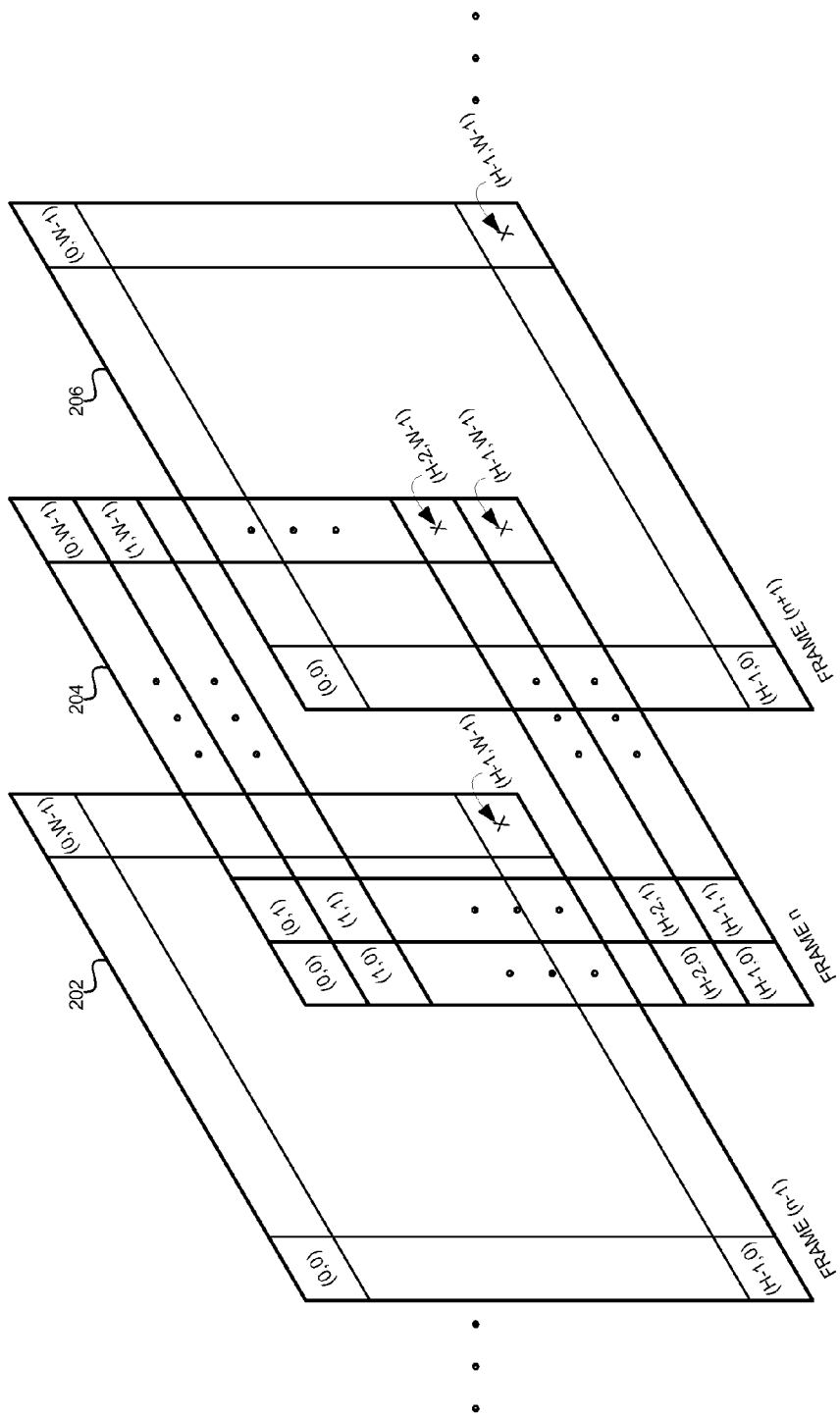
FIG. 2 is a diagram illustrating exemplary consecutive video pictures for noise reduction operations, in connection with an embodiment of the invention.

FIG. 2 is a diagram illustrating exemplary consecutive video pictures for noise reduction operations, in connection with an embodiment of the invention. Referring to FIG. 2, there is shown a current video picture 204, a previous video picture 202, and a next video picture 206. The current video picture 204 or PICTURE n may correspond to a current picture being processed by the video processing block 102 in FIG. 1. The previous video picture 202 or PICTURE (n−1) may correspond to an immediately previous picture to the current video picture 204. The next video picture 206 or PICTURE (n+1) may correspond to an immediately next picture to the current video picture 204. The previous video picture 202, the current video picture 204, and/or the next video picture 206 may be processed directly from the video input stream or after being buffered in the video processing block 102, for example. The current video picture 204, the previous video picture 206, and the next video picture 208 may comprise luma (Y) and/or chroma (Cb, Cr) information. In embodiments where video fields are utilized as pictures, the previous video picture 202 may refer to the previous field of the same parity as the current video picture 204, and the next video picture 206 may refer to the next field of the same parity as the current picture 204. The previous, current and next video fields of the same parity may be referred to as consecutive video pictures.

Pixels in consecutive video pictures are said to be collocated when having the same picture location, that is, . . . , $P_{n-1}(x,y), P_n(x,y), P_{n+1}(x,y), \ldots$, where $P_{n-1}$ indicates a pixel value in the previous video picture 202, $P_n$ indicates a pixel value in the current video picture 204, $P_{n+1}$ indicates a pixel value in the next video picture 206, and (x,y) is the common picture location between pixels. As shown in FIG. 2, for the picture location, (x,y) is such that x=0, 1, . . . , W−1 and y=0, 1, . . . , H−1, where W is the picture width and H is the picture height, for example.

Operations of the video processing block 102 in FIG. 1 need not be limited to the use of exemplary consecutive video pictures as illustrated in FIG. 2. For example, the video processing block 102 may perform filtering operations on consecutive video fields of the same parity, that is, on consecutive top fields or consecutive bottom fields. When performing noise reduction operations on consecutive video fields of the same parity, pixels in the video processing block 102 are said to be collocated when having the same picture location, that is, . . . , $P_{n-1}(x,y), P_n(x,y), P_{n+1}(x,y), \ldots$, where $P_{n-1}$ indicates a pixel value in a previous video field, $P_n$ indicates a pixel value in a current video field, $P_{n+1}$ indicates a pixel value in a next video field, and (x,y) is the common picture location between pixels.

Figure 3A:
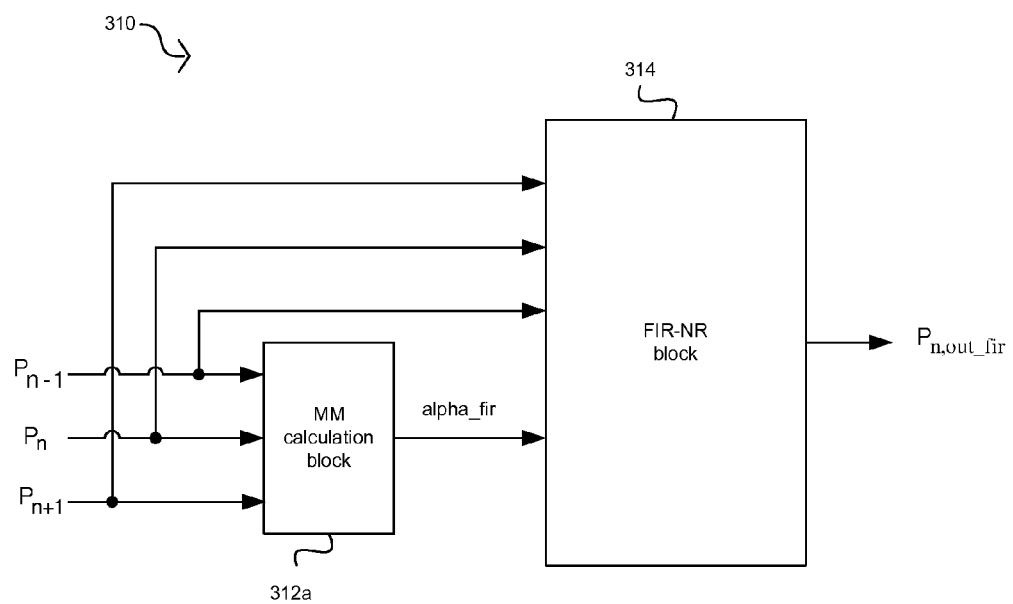
FIG. 3A is a block diagram of an exemplary finite impulse response (FIR) filtering system with noise reduction, in accordance with an embodiment of the invention.

FIG. 3A is a block diagram of an exemplary finite impulse response (FIR) filtering system with noise reduction, in accordance with an embodiment of the invention. Referring to FIG. 3A, there is shown an FIR filtering system 310 that may comprise a motion metric (MM) calculation block 312a and an FIR noise reduction (FIR-NR) block 314. The FIR filtering system 310 may be implemented as a portion of the video processing block 102 in FIG. 1, for example. The MM calculation block 312a may comprise suitable logic, circuitry, and/or code that may be enabled to determine a motion metric (MM) parameter based on contents from a current pixel, $P_n$ a previous collocated pixel, $P_{n-1}$, and a next collocated pixel, $P_{n+1}$. The MM calculation block 312a may utilize the MM parameter to determine an FIR blending factor, $\alpha_{fir}$. U.S. application Ser. No. 11/314,679 filed Dec. 20, 2005, provides a detailed description of a FIR filtering system with noise reduction, and is hereby incorporated by reference in its entirety.

The FIR blending factor, $\alpha_{fir}$, may be determined by a mapping operation of the motion information. This mapping operation may respond rapidly to motion to avoid unnecessary filtering in moving areas, for example. The FIR-NR block 314 may comprise suitable logic, circuitry, and/or code that may be enabled to FIR filter the current pixel, $P_n$. The FIR-NR block 314 may be enabled to perform a 3-tap FIR filtering operation given by the expression:

$$P_{n,fir}(x,y) = c_0 \cdot P_{n-1}(x,y) + c_1 \cdot P_n(x,y) + c_2 \cdot P_{n+1}(x,y), \quad (1A)$$

where $c_0$, $c_1$, and $c_2$ are the 3-tap FIR filter coefficients. In this regard, the FIR filter coefficients may be stored in at least a portion of the registers 110 in FIG. 1, for example. The FIR-NR block 314 may be enabled to generate an FIR-blended current pixel, $P_{n,out\_fir}$, based on the expression:

$$P_{n,out\_fir}(x,y) = \alpha_{fir} \cdot P_n(x,y) + (1-\alpha_{fir}) \cdot P_{n,fir}(x,y), \quad (2A)$$

where $\alpha_{fir}$ is the FIR blending factor generated by the MM calculation block 312a. In this regard, equation (2A) blends or combines the values of the current pixel and the FIR-filtered current pixel generated in equation (1A). The level of blending provided by equation (2A) is based on the value of the FIR blending factor, $\alpha_{fir}$.

In operation, the MM calculation block 312a and the FIR-NR block 314 may receive the current pixel, $P_n$, the previous collocated pixel, $P_{n-1}$, and the next collocated pixel, $P_{n+1}$. The MM calculation block 312a may utilize the contents of the received pixels to generate the FIR blending factor, $\alpha_{fir}$. The FIR-NR block 314 may utilize the contents of the received pixels to generate the FIR-filtered current pixel in accordance with equation (1A). The FIR-NR block 314 may utilize the results from equation (1A) and the FIR blending factor, $\alpha_{fir}$, generated by the MM calculation block 312a to generate the FIR-blended current pixel, $P_{n,out\_fir}$, in accordance with equation (2A).

Figure 3B:
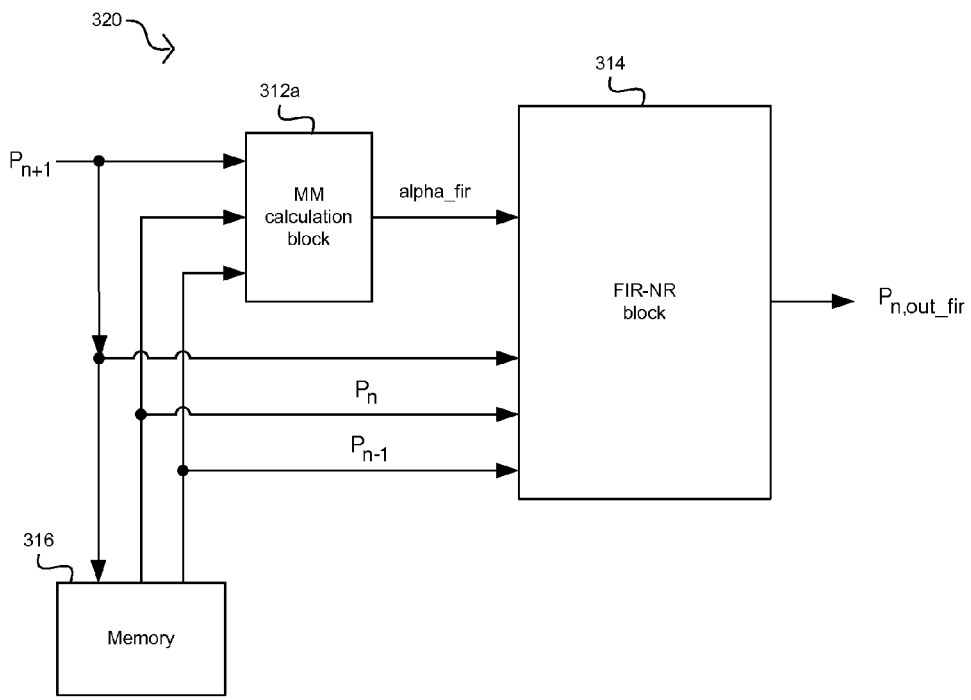
FIG. 3B is a block diagram of an exemplary 3-tap finite impulse response (FIR) filtering system with noise reduction and picture storage, in accordance with an embodiment of the invention.

FIG. 3B is a block diagram of an exemplary 3-tap finite impulse response (FIR) filtering system with noise reduction and picture storage, in accordance with an embodiment of the invention. Referring to FIG. 3B, there is shown a 3-tap FIR filtering system 320 that may comprise the MM calculation block 312a and the FIR-NR block 314 in FIG. 3A and a memory 316. The FIR filtering system 320 may be implemented as a portion of the video processing block 102 in FIG. 1, for example. The memory 316 may comprise suitable logic, circuitry, and/or code that may be enabled to store at least a portion of video pictures from the video input stream. The memory 316 may be enabled to store consecutive collocated pixels from the video input stream or from a buffered portion of the video input stream, for example. The memory 316 may be enabled to transfer stored pixels to the MM calculation block 312a and to the FIR-NR block 314 for processing. U.S. application Ser. No. 11/314,679 filed Dec. 20, 2005, provides a detailed description of a FIR filtering system with noise reduction and picture storage, and is hereby incorporated by reference in its entirety.

In operation, the previous collocated pixel, $P_{n-1}$, may be received first and may be stored in the memory 316. The current pixel, $P_n$, may be received next and may also be stored in the memory 316. When the next collocated pixel, $P_{n+1}$, is received by the FIR filtering system 320, all three pixels necessary to generate the FIR blending factor, $\alpha_{fir}$, and to perform the operations described in equation (1A) and equation (2A) have been received. The next collocated pixel, $P_{n+1}$, may be transferred directly to the MM calculation block 312a and to the FIR-NR block 314 for processing. The current pixel, $P_n$, and the previous collocated pixel, $P_{n-1}$, may also be transferred from the memory 316 to the MM calculation block 312a and to the FIR-NR block 314 for processing. The next collocated pixel, $P_{n+1}$, may be stored in the memory 316 to be utilized as a current pixel and/or a previous collocated pixel in a subsequent operation of the FIR filtering system 320. In this regard, when the next collocated pixel, $P_{n+1}$, is being received and stored, the previous collocated pixel, $P_{n-1}$, and the current collocated pixel, $P_n$, may be fetched from the memory 316 for processing with the next collocated pixel, $P_{n+1}$, in the MM calculation block 312a and the FIR-NR block 314. Moreover, calculation of the motion metric by the MM calculation block 312a may require that a region of pixels in a neighborhood around the next collocated pixel, $P_{n+1}$, the previous collocated pixel, $P_{n-1}$, and the current collocated pixel, $P_n$, also be stored in the memory 316 and also be fetched from the memory 316 at the appropriate instance.

FIG. 3O is a block diagram of an exemplary 2-tap finite impulse response (FIR) filtering system with noise reduction and picture storage, in accordance with an embodiment of the invention. Referring to FIG. 3O, there is shown a 2-tap FIR filtering system 325 that may comprise the MM calculation block 312a and the FIR-NR block 314 in FIG. 3A and a memory 316. The FIR filtering system 325 may be implemented as a portion of the video processing block 102 in FIG. 1, for example. The memory 316 may be as described in FIG. 3B.

In operation, the previous collocated pixel, $P_{n-1}$, may be received first and may be stored in the memory 316. The FIR-NR block 314 may be enabled to perform a 2-tap FIR filtering operation given by the expression:

$$P_{n,fir}(x,y) = C_0 * P_{n-1}(x,y) + C_1 * P_n(x,y), \qquad (1B)$$

where $c_0$ and $c_1$ are the 2-tap FIR filter coefficients. In this regard, the FIR filter coefficients may be stored in at least a portion of the registers 110 in FIG. 1, for example. The FIR-NR block 314 may be enabled to generate an FIR-blended current pixel, $P_{n,out\_fir}$, based on the expression:

$$P_{n,out\_fir}(x,y) = \alpha_{fir} \cdot P_n(x,y) + (1-\alpha_{fir}) \cdot P_{n,fir}(x,y), \qquad (2B)$$

where $\alpha_{fir}$ is the FIR blending factor generated by the MM calculation block 312a.

In this regard, equation (2B) blends or combines the values of the current pixel and the FIR-filtered current pixel generated in equation (1B). The level of blending provided by equation (2B) is based on the value of the FIR blending factor, $\alpha_{fir}$. When the current collocated pixel, $P_n$, is received by the FIR filtering system 325, the two pixels necessary to generate the FIR blending factor, $\alpha_{fir}$, and to perform the operations described in equation (1B) and equation (2B) have been received. The current collocated pixel, $P_n$, may be transferred directly to the MM calculation block 312a and to the FIR-NR block 314 for processing. The previous collocated pixel, $P_{n-1}$, may also be transferred from the memory 316 to the MM calculation block 312a and to the FIR-NR block 314 for processing. The current collocated pixel, $P_n$, may be stored in the memory 316 to be utilized as a previous collocated pixel in a subsequent operation of the FIR filtering system 325. In this regard, when the current collocated pixel, $P_n$, is being received and stored, and the previous collocated pixel, $P_{n-1}$, may be fetched from the memory 316 for processing with the current collocated pixel, $P_n$, in the MM calculation block 312a and the FIR-NR block 314. Moreover, calculation of the motion metric by the MM calculation block 312a may require that a region of pixels in a neighborhood around the current collocated pixel, $P_n$, and the previous collocated pixel, $P_{n-1}$ also be stored in the memory 316 and also be fetched from the memory 316 at the appropriate instance.

Figure 3C:
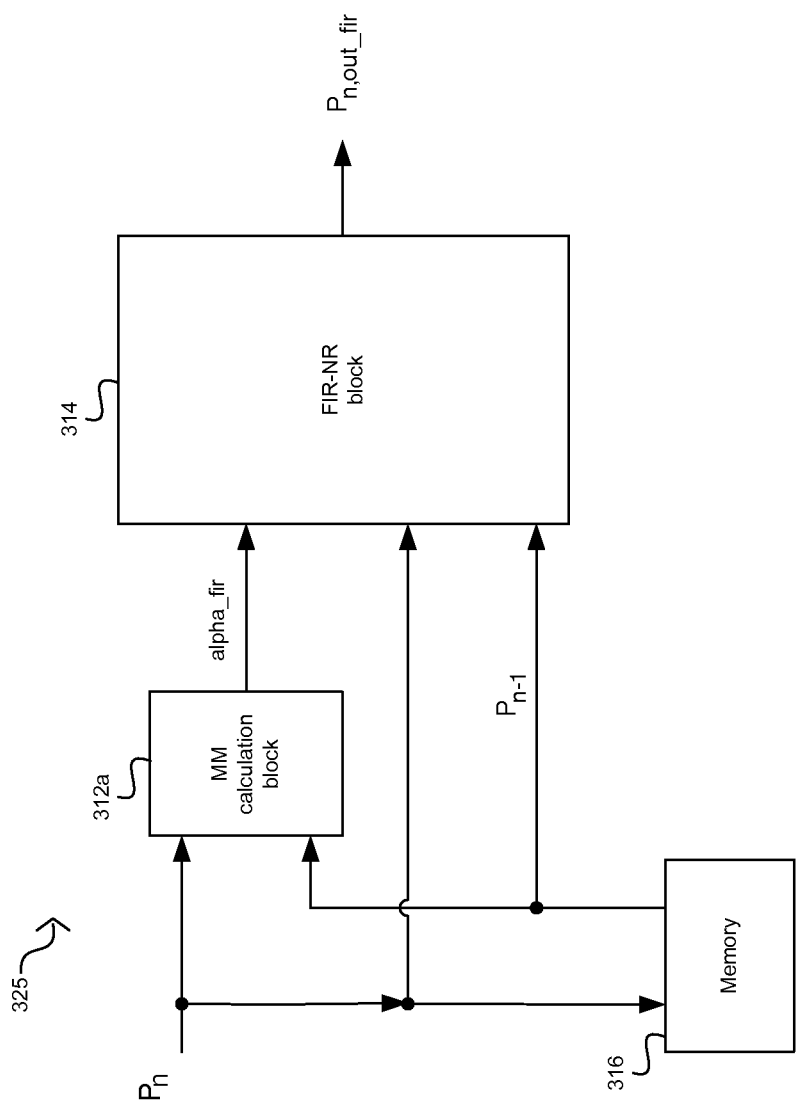
FIG. 3C is a block diagram of an exemplary 2-tap finite impulse response (FIR) filtering system with noise reduction and picture storage, in accordance with an embodiment of the invention.

Motion-adaptive FIR-based filtering systems, such as those described in FIGS. 3A, 3B and 3C may generally provide filtered outputs with few motion trail artifacts but may be limited in the amount of noise that may be reduced even for static areas in the video signal.

Figure 3D:
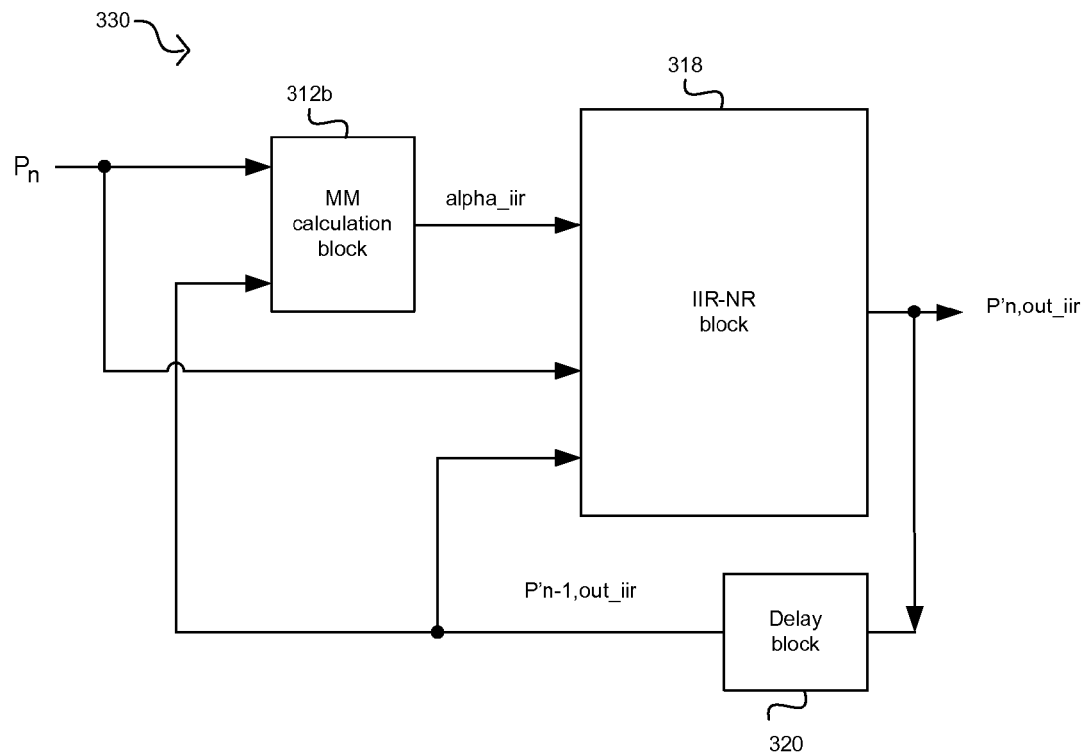
FIG. 3D is a block diagram of an exemplary infinite impulse response (IIR) filtering system with noise reduction, in accordance with an embodiment of the invention.

FIG. 3D is a block diagram of an exemplary infinite impulse response (IIR) filtering system with noise reduction, in accordance with an embodiment of the invention. Referring to FIG. 3D, there is shown an IIR filtering system 330 that may comprise an MM calculation block 312b, an IIR noise reduction (IIR-NR) block 318, and a delay block 320. The IIR filtering system 330 may be implemented as a portion of the video processing block 102 in FIG. 1, for example. The MM calculation block 312b may comprise suitable logic, circuitry, and/or code that may be enabled to determine a motion metric (MM) parameter based on contents from a current pixel, $P_n$, and from an IIR-filtered previous collocated pixel, $P_{n-1}'$. The MM calculation block 312b may utilize the MM parameter to determine an IIR blending factor, $\alpha_{iir}$. The IIR blending factor, $\alpha_{iir}$, may be determined by a mapping operation of the motion information. This mapping operation may respond rapidly to motion to avoid unnecessary filtering in moving areas, for example. U.S. application Ser. No. 11/314,679 filed Dec. 20, 2005, provides a detailed description of a IIR filtering system with noise reduction, and is hereby incorporated by reference in its entirety.

The IIR-NR block 318 may comprise suitable logic, circuitry, and/or code that may be enabled to IIR filter the current pixel, $P_n$. The IIR-NR block 318 may also be enabled to generate an IIR-blended current pixel given by the expression:

$$P_{n,out\_iir}'(x,y) = \alpha_{iir} \cdot P_n(x,y) + (1-\alpha_{iir}) \cdot P_{n-1,out\_iir}(x,y), \qquad (3)$$

where the IIR blending factor, $\alpha_{iir}$, controls the contribution of the IIR-filtered previous collocated pixel, $P_{n-1}'$, to the IIR-blended current pixel. The delay block 320 may comprise suitable logic, circuitry, and/or code that may be enabled to delay by one video picture the transfer of the recursive feedback from the output of the IIR-NR block 318 to the MM calculation block 312b and to the input of the IIR-NR block 318. In this regard, both the MM calculation block 312b and the IIR-NR block 318 may utilize a recursive feedback operation based on the IIR-filtered previous collocated pixel, $P_{n-1}'$. A delay by one video picture may comprise a delay by one video frame, for example when the video input is in interlaced format and video fields are utilized as pictures.

In operation, the current pixel, $P_n$, and the IIR-filtered previous collocated pixel, $P_{n-1}'$, are received by the MM calculation block 312b and the IIR-NR block 318. The MM calculation block 312b may generate the IIR blending factor, $\alpha_{iir}$. The IIR-NR block 318 may IIR filter the current pixel, $P_n$, and may utilize the IIR-filtered current pixel and the IIR-filtered previous collocated pixel, $P_{n-1}'$, to perform the operation described by equation (3). The resulting IIR-blended current pixel may be transferred to the delay block 320 and may be utilized as the IIR-filtered previous collocated pixel, $P_{n-1}'$, for a subsequent operation in the IIR filtering system 330.

Motion-adaptive IIR filtering methods may achieve significant noise reduction but may result in artifacts such as motion trails and/or blurring of moving objects. To avoid these motion artifacts, IIR noise reduction operations may be configured conservatively, limiting, in some instances, the ability to reduce noise components.

Figure 4A:
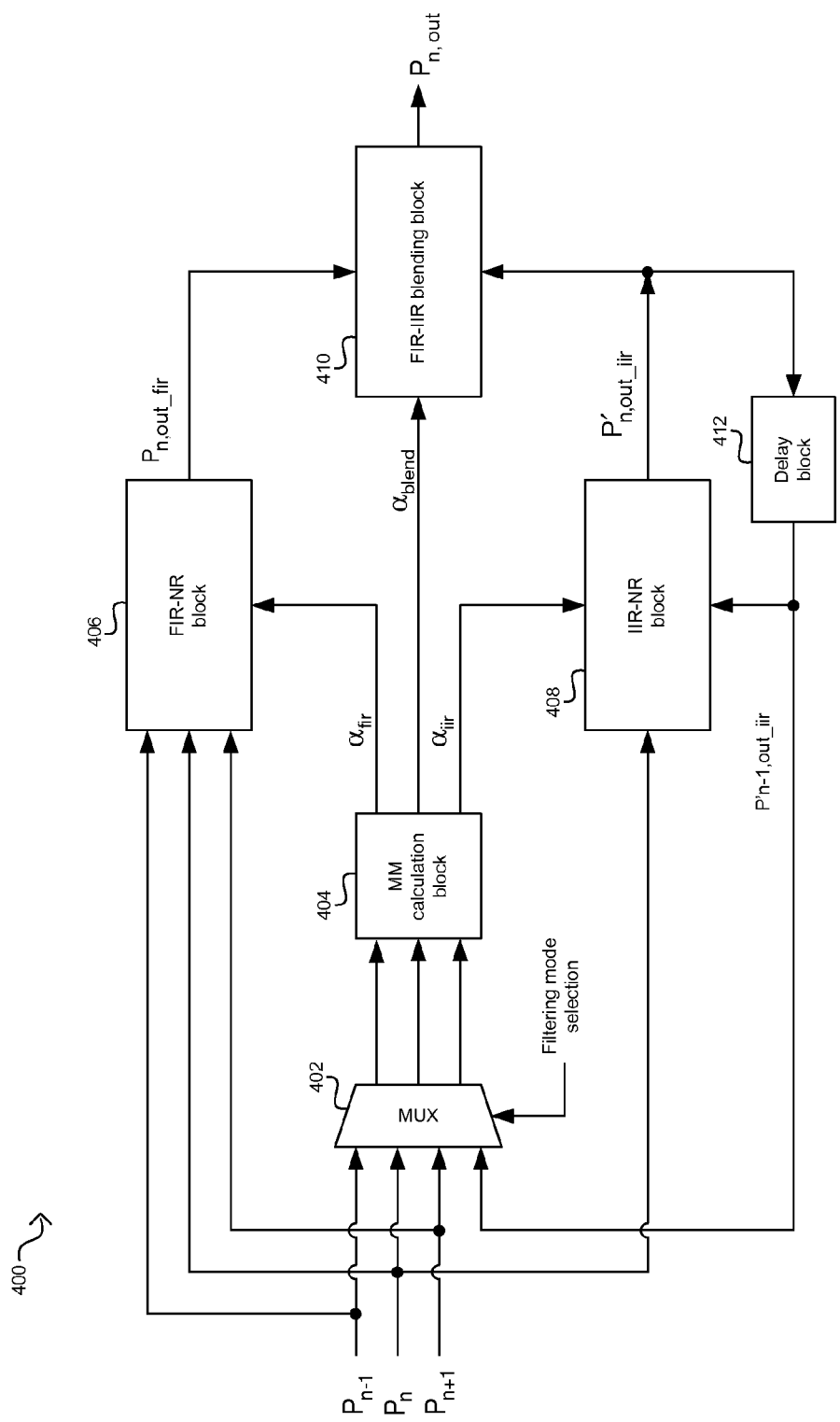
FIG. 4A is a block diagram of an exemplary FIR/IIR blended filtering system with noise reduction, in accordance with an embodiment of the invention.

FIG. 4A is a block diagram of an exemplary FIR-IIR blended filtering system with noise reduction, in accordance with an embodiment of the invention. Referring to FIG. 4A, there is shown an FIR-IIR blended filtering system 400 that may comprise a multiplexer (MUX) 402, an MM calculation block 404, an FIR-NR block 406, an IIR-NR block 408, an FIR-IIR blending block 410, and a delay block 412. The FIR-IIR blended filtering system 400 may be implemented as a portion of the video processing block 102 in FIG. 1, for example. U.S. application Ser. No. 11/314,679 filed Dec. 20, 2005, provides a detailed description of a FIR-IIR blended filtering system with noise reduction, and is hereby incorporated by reference in its entirety.

The MUX 402 may comprise suitable logic, circuitry, and/or code that may be enabled to select the inputs to the MM calculation block 404 in accordance with a filtering mode. The MUX 402 may be enabled to select a previous collocated pixel, $P_{n-1}$, a current pixel, $P_n$, and a next collocated pixel, $P_{n+1}$, when an FIR filtering mode is selected. The MUX 402 may be enabled to select the current pixel, $P_n$, and the IIR-filtered previous collocated pixel, $P_{n-1}'$, when an IIR filtering mode is selected. When an adaptive FIR-IIR filtering mode is selected, the MUX 402 may be enabled to first select the pixels necessary for FIR filtering and then select the pixels necessary for IIR filtering. In another embodiment of the invention, when the adaptive FIR-IIR filtering mode is selected, the MUX 402 may be enabled to first select the pixels necessary for IIR filtering and then select the pixels necessary for FIR filtering.

In another embodiment of the invention, when the adaptive FIR-IIR filtering mode is selected, for example, the MUX 402 may enable selection of the IIR-filtered previous collocated pixel, $P_{n-1}'$, a current pixel, $P_n$, and a next collocated pixel, $P_{n+1}$.

The MM calculation block 404 may comprise suitable logic, circuitry, and/or code that may be enabled to determine a motion metric (MM) parameter based on contents from at least one of the current pixel, $P_n$, the previous collocated pixel, $P_{n-1}$, the next collocated pixel, $P_{n+1}$, and the IIR-filtered previous collocated pixel, $P_{n-1}'$. The MM calculation block 404 may be enabled to generate a different MM parameter for each of the filtering modes supported by the FIR-IIR blended filtering system 400. For example, when the FIR-IIR blended filtering system 400 supports an FIR filtering mode, an IIR filtering mode, and an adaptive FIR-IIR filtering mode, the MM calculation block 404 may be enabled to determine three different MM parameters. The MM calculation block 404 may be enabled to generate an FIR blending factor, $\alpha_{fir}$, an IIR blending factor, $\alpha_{iir}$, and/or an adaptive FIR-IIR blending factor, $\alpha_{blend}$. The MM calculation block 404 may generate the blending factors based on the MM parameter for the filtering mode selected, for example.

The MM parameter generated by the MM calculation block 404 may comprise a luminance (Y) component, $MM_Y(x,y)$, and two chrominance (Cb, Cr) components, $MM_{Cb}(x,y)$ and $MM_{Cr}(x,y)$. The luminance component of the MM parameter may be determined based on the expression:

$$MM_Y(x, y) = \frac{1}{w \times h|_{(i,j)}} \sum |Diff_n(i, j)|, \quad (4)$$

where w and h are the width and height of a window or neighborhood around the pixel location (x,y), i and j may correspond to indices that may be utilized to identify the location of pixels in the neighborhood, $Diff_n(i,j)$ is a differential variable that may be determined in accordance with the filtering mode selected, and $\Sigma|Diff_n(i,j)|$ is a sum of the absolute values of the differential variables determined in the neighborhood of size w×h. The neighborhood size may be determined by taking into consideration the effect on moving impulses, generally thin edges, and/or the effect on smoothing out noise, for example. Some exemplary neighborhood sizes may be 3×3, 5×3, 3×5, 7×3, 5×5, 7×5, and 7×7, for example. Selection of a neighborhood size may depend, at least in part, on implementation requirements.

The values of $Diff_n(i,j)$ in equation (4) may be determined based on the following expressions:

$$Diff_n(i,j)=2*(|P_n(i,j)-P_{n-1}(i,j)|+|P_n(i,j)-P_{n+1}(i,j)|), \quad (5)$$

$$Diff_n(i,j)=4*(|P_n(i,j)-P_{n-1}'(i,j)|), \quad (6)$$

$$Diff_n(i,j)=2*(|P_n(i,j)-P_{n-1}'(i,j)|+|P_n(i,j)-P_{n+1}(i,j)|), \quad (7)$$

where equation (5) may be utilized when the FIR filtering mode is selected, equation (6) may be utilized when the IIR filtering mode is selected, and equation (7) may be utilized when the adaptive FIR-IIR filtering mode is selected. The factor 2 in equation (5) and equation (7) and the factor 4 in equation (6) may depend on the implementation of the FIR-IIR blended filtering system 400 and may be utilized to maintain a specified precision for integer operations. In this regard, the factors in equation (5), equation (7), and equation (6) need not be limited to the examples provided.

The chrominance components of the MM parameter, $MM_{Cb}(x,y)$ and $MM_{Cr}(x,y)$, may be determined by following an approach substantially as described for determining equation (4). In this regard, determining the chrominance components may require consideration of the lower resolution of the chrominance components to the luma component in 4:2:2 video format, for example. The MM parameter determined by the MM calculation block 404 may be given by the expression:

$$MM(x,y)=w_0 \cdot MM_L(x,y)+w_1 \cdot MM_{Cb}(x,y)+w_2 \cdot MM_{Cr}(x,y), \quad (8)$$

where $w_0$, $w_1$, and $w_2$ are weight factors that may be utilized to value differently the contribution of the luminance and chrominance components to the MM parameter. The weight factors $w_0$, $w_1$, and $w_2$ may satisfy the conditions that $w_0+w_2=1$. When setting $w_0>w_1$, and $w_0>w_2$, the luma component may contribute more than the chroma component, for example. The weight factors $w_0$, $w_1$, and $w_2$ may be stored in the registers 110 in FIG. 1, for example.

The MM calculation block 404 may be enabled to generate the blending factors $\alpha_{fir}$, $\alpha_{iir}$, and $\alpha_{blend}$ based on the following expression:

$$\alpha=K_0(1-(K_1/MM^2)), \quad (9)$$

where $K_0$ and $K_1$ are factors determined for each of the blending factors and MM is the MM parameter determined in equation (8) for a selected filtering mode. For example, the factors $K_{0,FIR}$ and $K_{1,FIR}$ may be utilized to determine $\alpha_{fir}$, the factors $K_{0,IIR}$ and $K_{1,IIR}$ may be utilized to determine $\alpha_{iir}$, and the factors $K_{0,blend}$ and $K_{1,blend}$ may be utilized to determine $\alpha_{blend}$. The non-linearity of equation (9) may enable the blending factors to increase more rapidly as the MM parameter increases and avoid artifacts such as motion blurriness or motion trails for moving objects, for example. Moreover, the non-linear behavior of the blending factors may allow moving content to retain its sharpness.

The MM calculation block 404 may also be enabled to generate noise levels for a plurality of noise level intervals that may be utilized to determine and/or detect the video noise level in a current video picture. In this regard, the MM calculation block 404 may utilize the MM parameters and may collect and accumulate the MM parameters into corresponding noise level intervals to determine the noise level corresponding to each of the noise level intervals. The noise level intervals may be determined from information stored in at least a portion of the registers 110. For example, the registers 110 may comprise information regarding the number of noise level intervals, the noise level interval lower threshold, NOISE_RANGE_LOWER_THD, and/or the noise level interval upper threshold, NOISE_RANGE_UPPER_THD. The MM calculation block 404 may generate the noise levels for each of the noise level intervals and may store the results in at least a portion of the registers 110, for example. In this regard, the processor 104 may utilize the noise levels determined by the MM calculation block 404 by retrieving the information from the registers 110, for example.

The FIR-NR block 406 may comprise suitable logic, circuitry, and/or code that may be enabled to generate an FIR-blended current pixel, $P_{n,out\_fir}$, in accordance with equation (1) and equation (2) and utilizing the FIR blending factor, $\alpha_{fir}$, generated by the MM calculation block 404. The FIR-NR block 406 may receive the current pixel, $P_n$, the previous collocated pixel, $P_{n-1}$, and the next collocated pixel, $P_{n+1}$, directly from the video input stream or from the input buffer 112 in FIG. 1, for example. In some implementations, at least a portion of the received data, such as the value of the current pixel, $P_n$, and the value of the previous collocated pixel, $P_{n-1}$, for example, may be fetched from the memory 106 in FIG. 1 to the input buffer 112 in the video processing block 102, for example. The FIR-NR block 406 may transfer the FIR-blended current pixel, $P_{n,out\_fir}$, to the FIR-IIR blending block 410 for processing.

The IIR-NR block 408 may comprise suitable logic, circuitry, and/or code that may be enabled to generate an IIR-blended current pixel, $P_{n,out\_iir}'$, in accordance with equation (3) and utilizing the IIR blending factor, $\alpha_{iir}$, generated by the MM calculation block 404. The IIR-NR block 408 may receive the current pixel, $P_n$ directly from the video input stream or from the input buffer 112 in FIG. 1, for example. The IIR-NR block 408 may receive IIR-filtered previous collocated pixel, $P_{n-1}'$, from the delay block 412. The IIR-NR block 408 may transfer the IIR-blended current pixel, $P_{n,out\_iir}'$, to the FIR-IIR blending block 410 for processing and to the delay block 412 for storage. The delay block 412 may comprise suitable logic, circuitry, and/or code that may be enabled to store the IIR-blended current pixel, $P_{n,out\_iir}'$, for one video picture. After one video picture, the IIR-blended current pixel, $P_{n,out\_iir}'$, stored in the delay block 412 may correspond to the IIR-filtered previous collocated pixel, $P_{n-1}'$. The delay block 412 may be enabled to transfer the IIR-filtered previous collocated pixel, $P_{n-1}'$, to the MUX 402 and to the IIR-NR block 408 for processing.

The FIR-IIR blending block 410 may comprise suitable logic, circuitry, and/or code that may be enabled to receive the FIR-blended current pixel, $P_{n,out\_fir}$, from the FIR-NR block 406 and the IIR-blended current pixel, $P_{n,out\_iir}'$, from the IIR-NR block 408 and generate a filtered output pixel, $P_{n,out}$. In this regard, the FIR-IIR blending block 410 may utilize the adaptive FIR-IIR blending factor, $\alpha_{blend}$, generated by the MM calculation block 404. The filtered output pixel, $P_{n,out}$, may be generated in accordance with the following expression:

$$P_{n,out}(x,y)=\alpha_{blend} \cdot P_{n,out\_fir}(x,y)+(1-\alpha_{blend}) \cdot P_{n,out\_iir}'(x,y) \quad (10)$$

where the adaptive FIR-IIR blending factor, $\alpha_{blend}$, blends the values of the FIR-blended current pixel, $P_{n,out\_fir}$, and the IIR-blended current pixel, $P_{n,out\_iir}$.

In operation, the current pixel, $P_n$, the previous collocated pixel, $P_{n-1}$, the next collocated pixel, $P_{n+1}$, and the IIR-filtered previous collocated pixel, $P_{n-1}'$, may be received by the MUX 402. The filtering mode may be selected and the appropriate pixel values may be transferred from the MUX 402 to the MM calculation block 404. The MM calculation block 404 may determine the MM parameter based on the filtering mode selected and may generate the blending factors $\alpha_{fir}$, $\alpha_{iir}$, and $\alpha_{blend}$. The MM calculation block 404 may transfer the corresponding blending factor to the FIR-NR block 406, the IIR-NR block 408, and the FIR-IIR blending block 410. The FIR-NR block 406 may FIR filter the current pixel, $P_n$, and generate the FIR-blended current pixel, $P_{n,out\_fir}$, based on the FIR blending factor, $\alpha_{fir}$. The IIR-NR block 408 may IIR filter the current pixel, $P_n$, and generate the IIR-blended current pixel, $P_{n,out\_iir}'$, based on the IIR blending factor, $\alpha_{iir}$. The IIR-blended current pixel, $P_{n,out\_iir}'$, may be transferred to the delay block 412. The FIR-IIR blending block 410 may receive the FIR-blended current pixel, $P_{n,out\_fir}$, and the IIR-blended current pixel, $P_{n,out\_iir}'$, and may generate the filtered output pixel, $P_{n,out}$, by utilizing the adaptive FIR-IIR blending factor, $\alpha_{blend}$ generated by the MM calculation block 404.

Figure 4B:
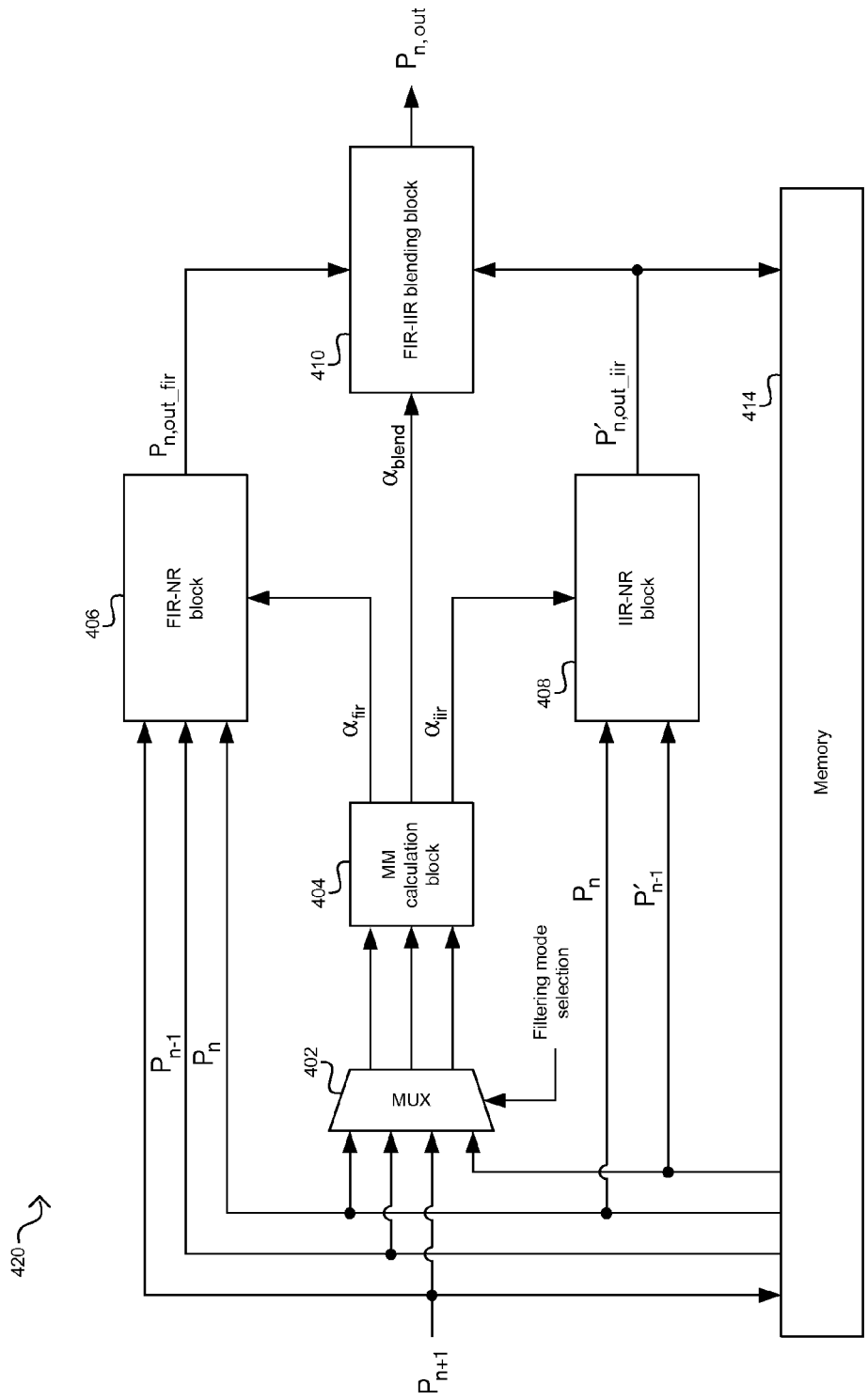
FIG. 4B is a block diagram of an exemplary 3-tap FIR/IIR blended filtering system with noise reduction and picture storage for IIR filtering feedback, in accordance with an embodiment of the invention.

FIG. 4B is a block diagram of an exemplary 3-tap FIR-IIR blended filtering system with noise reduction and picture storage for IIR filtering feedback, in accordance with an embodiment of the invention. Referring to FIG. 4B, there is shown an FIR-IIR blended filtering system 420 that may comprise the MUX 402, the MM calculation block 404, the FIR-NR block 406, the IIR-NR block 408, the FIR-IIR blending block 410, and a memory 414. The FIR-IIR blended filtering system 420 may be implemented as a portion of the video processing block 102 in FIG. 1, for example. The memory 414 may comprise suitable logic, circuitry, and/or code that may be enabled to store at least a portion of consecutive video pictures. The memory 414 may be enabled to store a current pixel, $P_n$, a previous collocated pixel, $P_{n-1}$, and an IIR-blended current pixel, $P_{n,out\_iir}'$, for example. After one video picture delay, the IIR-blended current pixel, $P_{n,out\_iir}'$, stored in the memory 414 may correspond to an IIR-filtered previous collocated pixel, $P_{n-1}'$. U.S. application Ser. No. 11/314,679 filed Dec. 20, 2005, provides a detailed description of a FIR-IIR blended filtering system with noise reduction and picture storage, and is hereby incorporated by reference in its entirety.

In operation, the previous collocated pixel, $P_{n-1}$, may be received first and may be stored in the memory 414. The current pixel, $P_n$, may be received next and may also be stored in the memory 414. The IIR-blended current pixel, $P_{n,out\_iir}'$, may be stored in the memory 414 after being generated in a previous filtering operation by the FIR-IIR blended filtering system 420. When the next collocated pixel, $P_{n+1}$, is received, all necessary pixel values for generating the current filtered output pixel, $P_{n,out}$, are available to the FIR-IIR blended filtering system 420. The previous collocated pixel, $P_{n-1}$, the current pixel, $P_n$, and the IIR-filtered previous collocated pixel, $P_{n-1}'$, may be transferred from the memory 414 to the MUX 402, the FIR-NR block 406, and/or the IIR-NR block 408. In this regard, the operations for generating the current filtered output pixel, $P_{n,out}$, by the FIR-IIR blended filtering system 420 may be substantially as described in FIG. 4A.

Figure 4C:
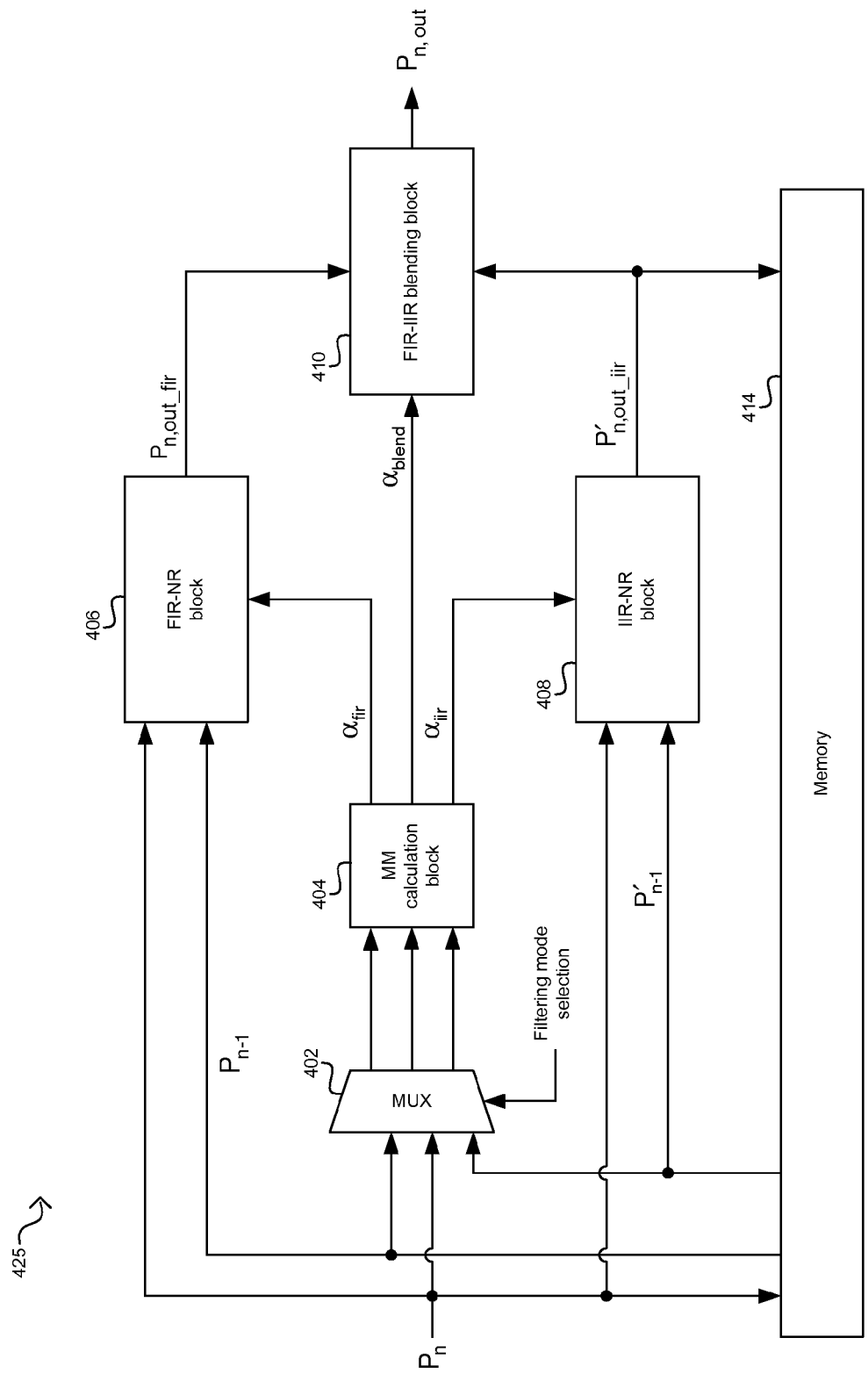
FIG. 4C is a block diagram of an exemplary 2-tap FIR/IIR blended filtering system with noise reduction and picture storage for IIR filtering feedback, in accordance with an embodiment of the invention.

FIG. 4C is a block diagram of an exemplary 2-tap FIR/IIR blended filtering system with noise reduction and picture storage for IIR filtering feedback, in accordance with an embodiment of the invention. Referring to FIG. 4C, there is shown an FIR-IIR blended filtering system 425 that may comprise the MUX 402, the MM calculation block 404, the FIR-NR block 406, the IIR-NR block 408, the FIR-IIR blending block 410, and a memory 414. The FIR-IIR blended filtering system 425 may be implemented as a portion of the video processing block 102 in FIG. 1, for example. The memory 414 may comprise suitable logic, circuitry, and/or code that may be enabled to store at least a portion of consecutive video pictures. The memory 414 may be enabled to store a previous collocated pixel, $P_{n-1}$, and an IIR-blended current pixel, $P_{n,out\_iir}'$, for example. After one video picture delay, the IIR-blended current pixel, $P_{n,out\_iir}'$, stored in the memory 414 may correspond to an IIR-filtered previous collocated pixel, $P_{n-1}'$.

In operation, the previous collocated pixel, $P_{n-1}$, may be received first and may be stored in the memory 414. The IIR-blended current pixel, $P_{n,out\_iir}'$, may be stored in the memory 414 after being generated in a previous filtering operation by the FIR-IIR blended filtering system 425. When the current collocated pixel, $P_n$, is received, all necessary pixel values for generating the current filtered output pixel, $P_{n,out}$, are available to the FIR-IIR blended filtering system 425. The previous collocated pixel, $P_{n-1}$, and the IIR-filtered previous collocated pixel, $P_{n-1}'$, may be transferred from the memory 414 to the MUX 402, the FIR-NR block 406, and/or the IIR-NR block 408. In this regard, the operations for generating the current filtered output pixel, $P_{n,out}$, by the FIR-IIR blended filtering system 425 may be substantially as described in FIG. 4A.

Figure 4D:
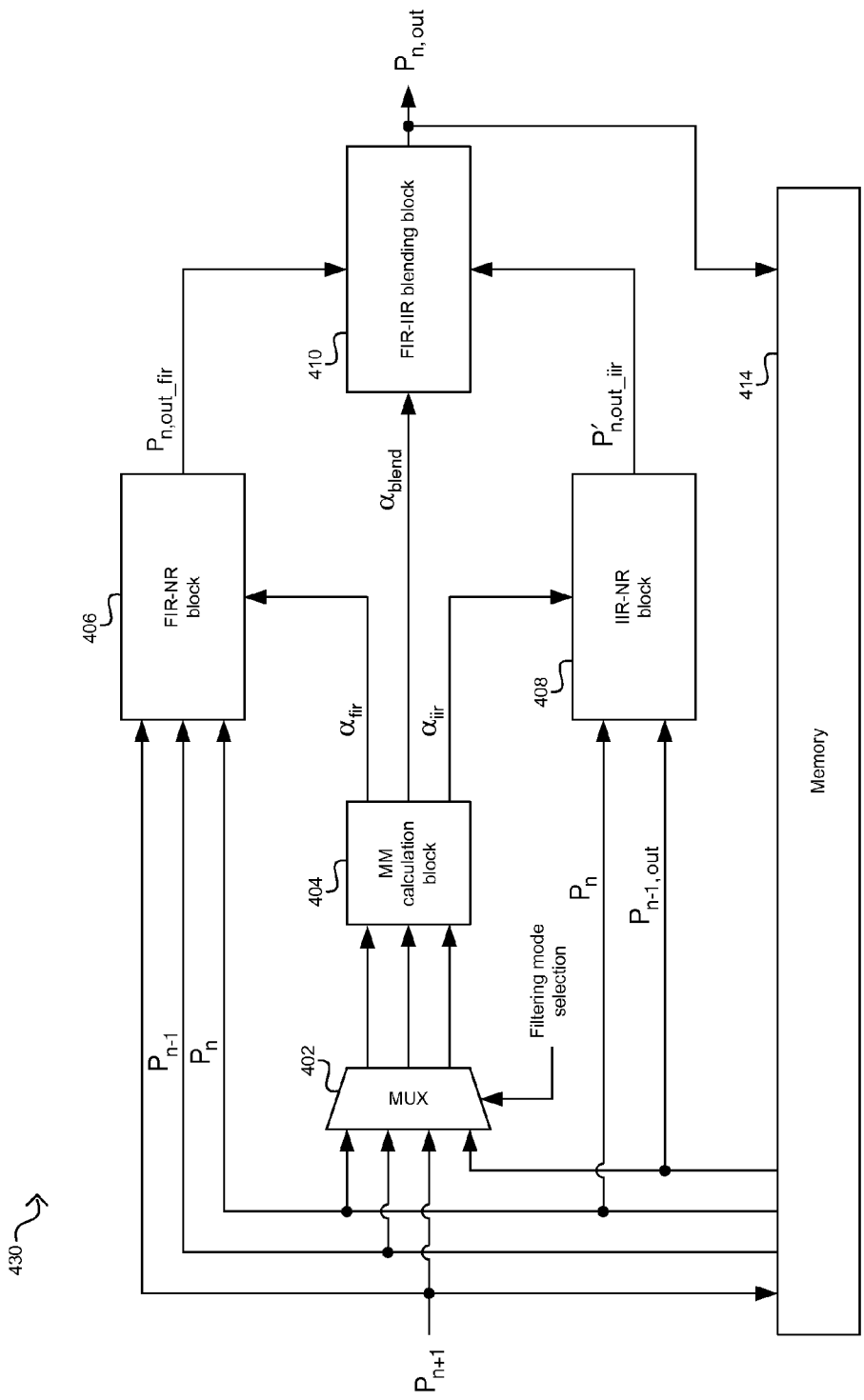
FIG. 4D is a block diagram of an exemplary FIR/IIR blended filtering system with noise reduction and picture storage for FIR/IIR filtering feedback, in accordance with an embodiment of the invention.

FIG. 4D is a block diagram of an exemplary FIR-IIR blended filtering system with noise reduction and picture storage for FIR-IIR filtering feedback, in accordance with an embodiment of the invention. Referring to FIG. 4D, there is shown an FIR-IIR blended filtering system 430 that may comprise the MUX 402, the MM calculation block 404, the FIR-NR block 406, the IIR-NR block 408, the FIR-IIR blending block 410, and the memory 414. The FIR-IIR blended filtering system 430 may be implemented as a portion of the video processing block 102 in FIG. 1, for example. The memory 414 in FIG. 4D may be enabled to store a current pixel, $P_n$, a previous collocated pixel, $P_{n-1}$, and a filtered output pixel, $P_{n,out}$, from an immediately previous operation by the FIR-IIR blended filtering system 430, for example. After a video picture, the filtered output pixel, $P_{n,out}$, stored in the memory 414 may correspond to a previous filtered output pixel, $P_{n-1,out}$. The IIR-NR block 408 in FIG. 4D may be enabled to generate an IIR-blended current pixel, $P_{n,out\_iir}'$, based on the current pixel, $P_n$, and the previous filtered output pixel, $P_{n-1,out}$. U.S. application Ser. No. 11/314,679 filed Dec. 20, 2005, provides a detailed description of a FIR-IIR blended filtering system with noise reduction and picture storage for FIR-IIR filtering feedback, and is hereby incorporated by reference in its entirety.

In operation, the previous collocated pixel, $P_{n-1}$, may be received first and may be stored in the memory 414. The current pixel, $P_n$, may be received next and may also be stored in the memory 414. The filtered output pixel, $P_{n,out}$, from an immediately previous filtering operation by the FIR-IIR blended filtering system 430 may be stored in the memory 414. When the next collocated pixel, $P_{n+1}$, is received, all necessary pixel values for generating the current filtered output pixel, $P_{n,out}$, are available to the FIR-IIR blended filtering system 430. The previous collocated pixel, $P_{n-1}$, the current pixel, $P_n$, and the previous filtered output pixel, $P_{n-1,out}$, may be transferred from the memory 414 to the MUX 402, the FIR-NR block 406, and/or the IIR-NR block 408. In this regard, the operations for generating the current filtered output pixel, $P_{n,out}$, by the FIR-IIR blended filtering system 430 may be substantially as described in FIG. 4A. In some instances, the performance of the FIR-IIR blended filtering system 420 in FIG. 4B may provide better noise reduction operations for a wide range of motion conditions than the FIR-IIR blended filtering system 430 in FIG. 4D. In this regard, the selection of the FIR-IIR blended filtering system 420 or the FIR-IIR blended filtering system 430 may be based on system requirements and/or architectural implementations, for example.

Figure 4E:
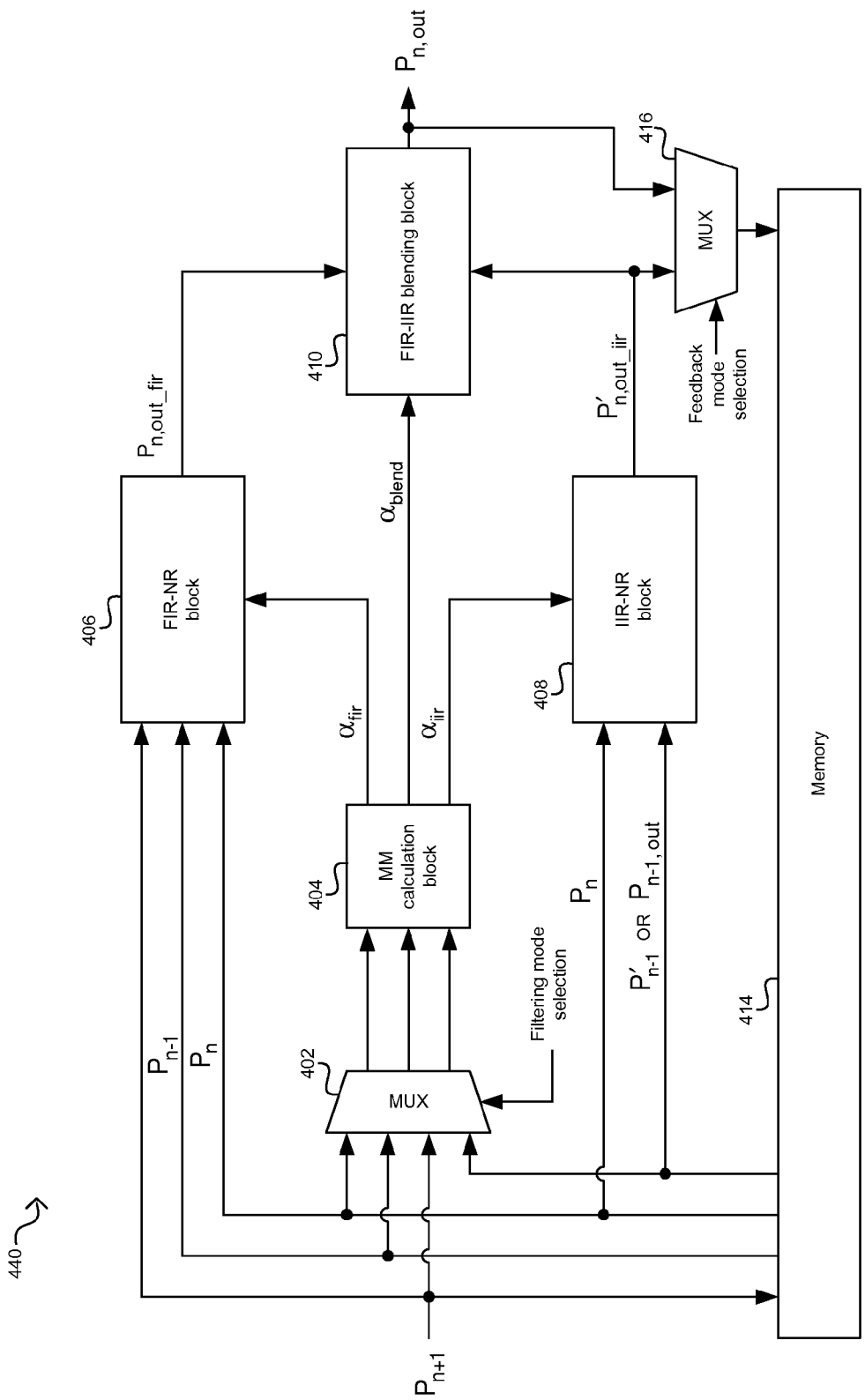
FIG. 4E is a block diagram of an exemplary FIR/IIR blended filtering system with noise reduction and picture storage for IIR filtering or FIR/IIR filtering feedback, in accordance with an embodiment of the invention.

FIG. 4E is a block diagram of an exemplary FIR-IIR blended filtering system with noise reduction and picture storage for IIR filtering or FIR-IIR filtering feedback, in accordance with an embodiment of the invention. Referring to FIG. 4E, there is shown an FIR-IIR blended filtering system 440 that may comprise the MUX 402, the MM calculation block 404, the FIR-NR block 406, the IIR-NR block 408, the FIR-IIR blending block 410, the memory 414, and a multiplexer (MUX) 416. The FIR-IIR blended filtering system 440 may be implemented as a portion of the video processing block 102 in FIG. 1, for example. The MUX 416 may comprise suitable logic, circuitry, and/or code that may be enabled to select between storing into the memory 414 a filtered output pixel, $P_{n,out}$, from the FIR-IIR blending block 410 or an IIR-blended current pixel, $P_{n,out\_iir}'$, from the IIR-NR block 408. In this regard, the MUX 416 may be utilized to select a feedback mode of operation for the FIR-IIR blended filtering system 440.

The memory 414 in FIG. 4E may be enabled to store a current pixel, $P_n$, a previous collocated pixel, $P_{n-1}$, a filtered output pixel, $P_{n,out}$, from an immediately previous filtering operation by the FIR-IIR blended filtering system 440, and/or an IIR-blended current pixel, $P_{n,out\_iir}'$, for example. When the filtered output pixel, $P_{n,out}$, is selected for storage by the MUX 416, after one video picture the filtered output pixel, $P_{n,out}$, stored in the memory 414 may correspond to a previous filtered output pixel, $P_{n-1,out}$. Similarly, $P_{n,out\_iir}'$, when the IIR-blended current pixel, is selected for storage by the MUX 416, after one video picture the IIR-blended current pixel, $P_{n,out\_iir}'$, stored in the memory 414 may correspond to an IIR-filtered previous collocated pixel, $P_{n-1}'$. The IIR-NR block 408 in FIG. 4E may be enabled to generate an IIR-blended current pixel, $P_{n,out\_iir}'$, based on the current pixel, $P_n$, and either the previous filtered output pixel, $P_{n-1,out}$, or the IIR-filtered previous collocated pixel, $P_{n-1}'$, in accordance with the feedback mode selection.

In operation, the previous collocated pixel, $P_{n-1}$, may be received first and may be stored in the memory 414. The current pixel, $P_n$, may be received next and may also be stored in the memory 414. The MUX 416 may determine to store the filtered output pixel, $P_{n,out}$, from an immediately previous filtering operation by the FIR-IIR blended filtering system 430 in the memory 414. In the alternative, the MUX 416 may determine to store the IIR-blended current pixel, $P_{n,out\_iir}'$ in the memory 414. When the next collocated pixel, $P_{n+1}$, is received, all necessary pixel values for generating the current filtered output pixel, $P_{n,out}$, are available to the FIR-IIR blended filtering system 430. The previous collocated pixel, $P_{n-1}$, the current pixel, $P_n$, and the previous filtered output pixel, $P_{n-1,out}$, or the IIR-filtered previous collocated pixel, $P_{n-1}'$, may be transferred from the memory 414 to the MUX 402, the FIR-NR block 406, and/or the IIR-NR block 408. In this regard, the operations for generating the current filtered output pixel, $P_{n,out}$, by the FIR-IIR blended filtering system 440 may be substantially as described in FIG. 4A.

Figure 5A:
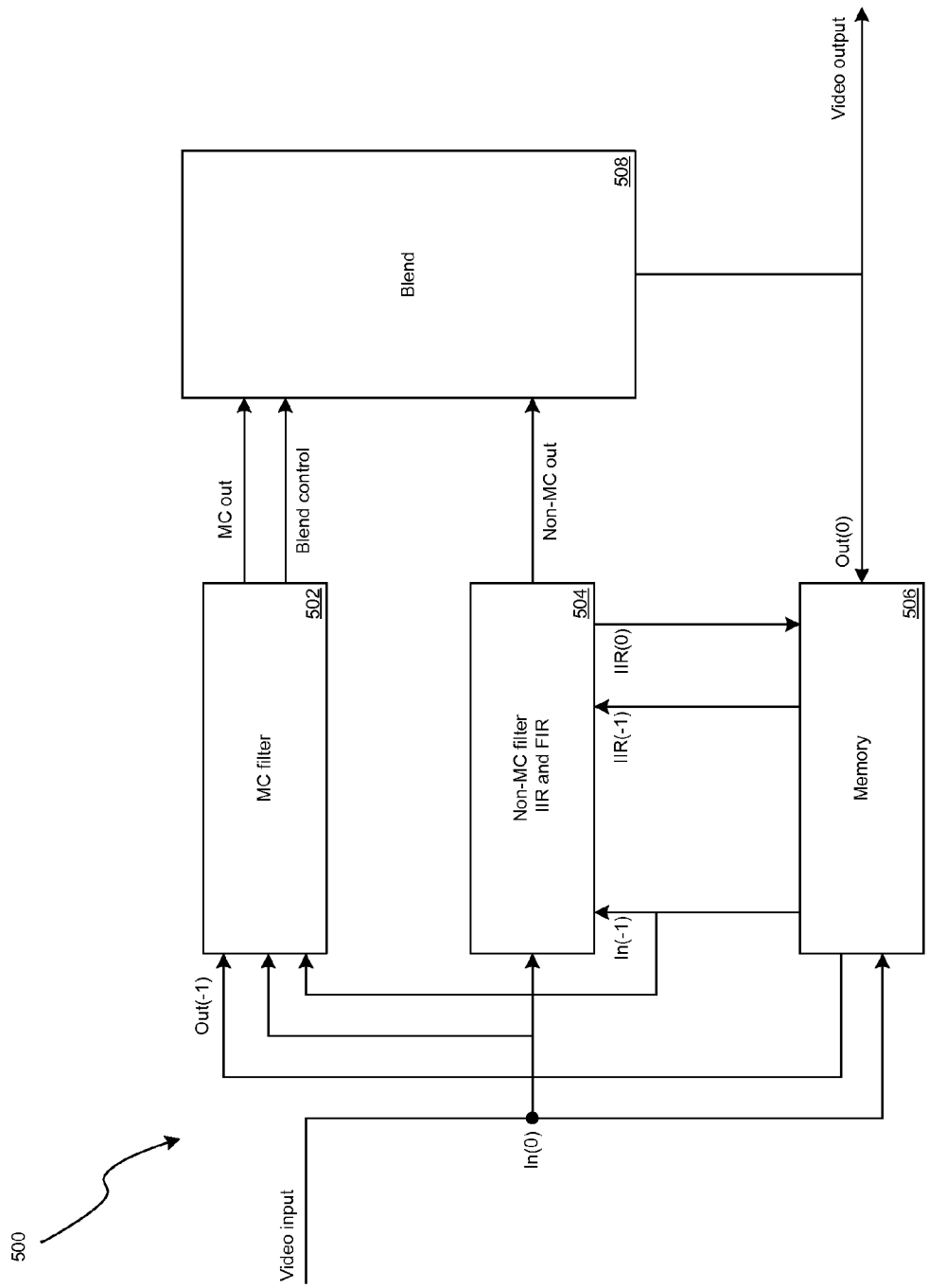
FIG. 5A is a block diagram illustrating an exemplary motion compensated temporal filtering system with a 2-tap FIR in the non-motion compensated (MC) path, in accordance with an embodiment of the invention.

FIG. 5A is a block diagram illustrating exemplary motion compensated temporal filtering system with a 2-tap FIR in the non-motion compensated (MC) path, in accordance with an embodiment of the invention. Referring to FIG. 5A, there is shown a MCTF system 500 that comprises a motion compensated (MC) filter block 502, a non-MC filter block 504, a memory 506, and a blend block 508.

The MC filter block 502 may comprise suitable logic, circuitry and/or code that may be enabled to perform motion compensation, motion estimation, and temporal filtering operation on the incoming video data. The MC filter block 502 may be enabled to receive a current input picture In(0), a previous input picture In(−1), and a previous output picture Out(−1) from the memory 506. The MC filter block 502 may be enabled to utilize the received current input picture In(0), a previous input picture In(−1), and a previous output picture Out(−1) from the memory 506 to generate an output signal (MC out) to the blend block 508. The MC filter block 502 may generate a blend control signal to the blend block.

The non-MC filter block 504 may comprise suitable logic, circuitry and/or code that may be enabled to perform motion adaptive temporal filtering (MATF). The non-MC filter block 504 may comprise at least one of: an IIR filter, and a FIR filter. The non-MC filter block 504 may comprise a 2-tap FIR filter, for example. The non-MC filter block 504 may be enabled to receive a current input picture In(0) from a video source. The non-MC filter block 504 may be enabled to receive the current input picture In(0), a previous input picture In(−1), and a previous output of an IIR filter within the non-MC filter block 504 from the memory 506 and generate an output signal (non MC out) to the blend block 508 and a current IIR filter output to the memory 506.

The memory 506 may comprise suitable logic, circuitry, and/or code that may be enabled to store at least a portion of consecutive video pictures. The memory 506 may be enabled to store a previous input picture In(−1), and a previous output of an IIR filter within the non-MC filter block 504. The memory 506 may be enabled to receive a current output picture from the blend block 508 and the current input picture In(0) from a video source.

The blend block 508 may comprise suitable logic, circuitry and/or code that may be enabled to receive a plurality of input signals: a MC out signal and a blend control signal from the MC filter block 502, and a non-MC out signal from the non-MC filter block 504. The blend block may be enabled to generate a current output picture Out(0) utilizing the received signals: MC out, blend control and non-MC out.

The MCTF operations may be performed on fields of video, so that the field pictures that are processed simultaneously may be of the same polarity or parity. For example, when the current input picture In(0) is a top field, the preceding input picture In(−1), current output picture Out(0) and previous output picture Out(−1) may also be top fields. The motion estimation and motion compensation operations may be correspondingly performed on top fields. Similarly, when a current input picture In(0) is a bottom field, the other pictures being processed simultaneously in the MCTF may be bottom fields.

Figure 5B:
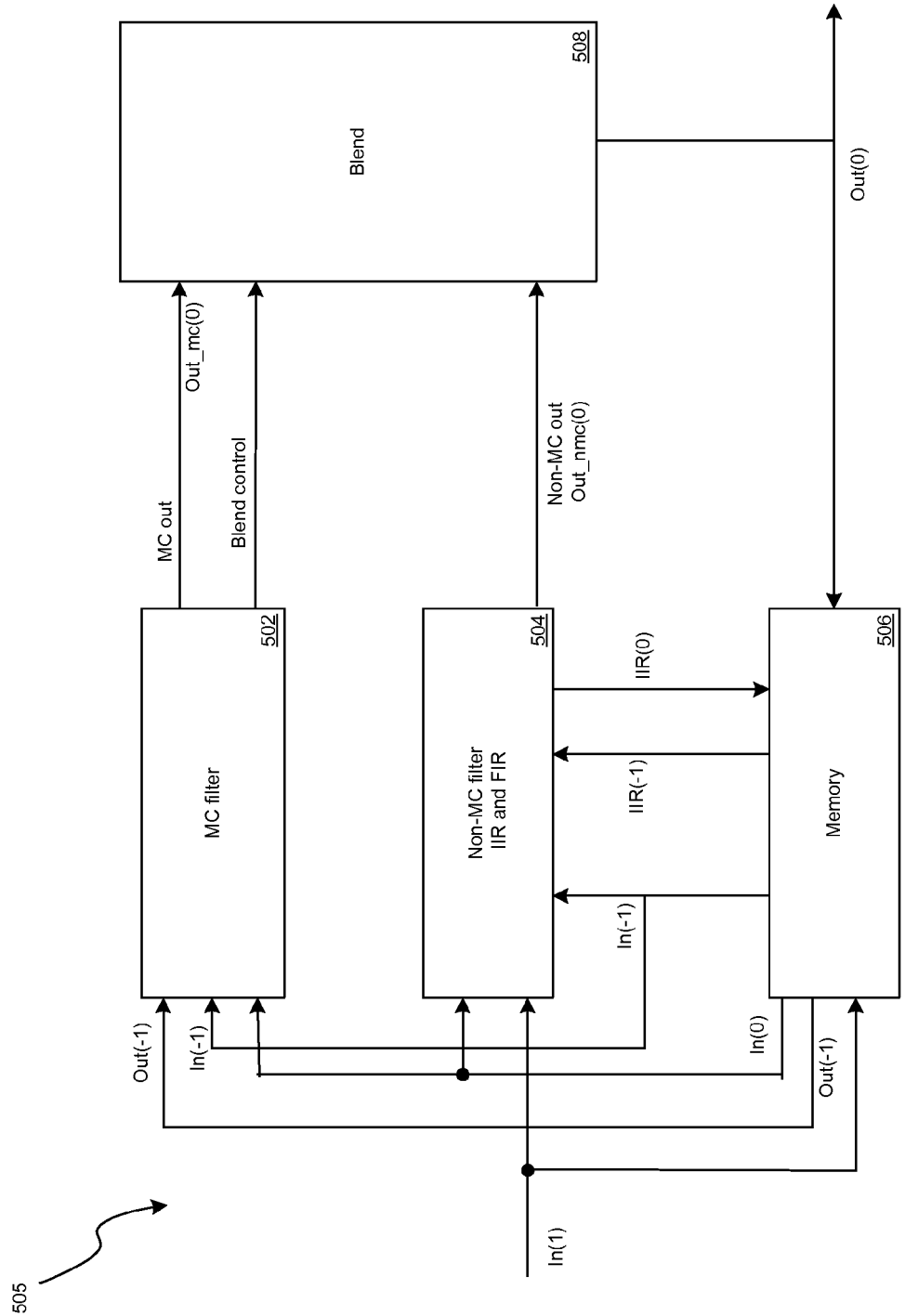
FIG. 5B is a block diagram illustrating an exemplary motion compensated temporal filtering system with a 3-tap FIR filter in the non-motion compensated (Non-MC) path, in accordance with an embodiment of the invention.

FIG. 5B is a block diagram illustrating an exemplary motion compensated temporal filtering system with a 3-tap FIR filter in the non-motion compensated (Non-MC) path, in accordance with an embodiment of the invention. Referring to FIG. 5B, there is shown a MCTF system 505 that comprises a motion compensated (MC) filter block 502, a non-MC filter block 504, a memory 506, and a blend block 508.

The MC filter block 502 may be substantially as described in FIG. 5A. The MC filter block 502 may be enabled to receive a current input picture In(0), a previous input picture In(−1), and a previous output picture Out(−1) from the memory 506. The MC filter block 502 may be enabled to utilize the received current input picture In(0), a previous input picture In(−1), and a previous output picture Out(−1) from the memory 506 to generate an output signal (MC out) to the blend block 508. The MC filter block 502 may generate a blend control signal to the blend block.

The non-MC filter block 504 may comprise suitable logic, circuitry and/or code that may be enabled to perform motion adaptive temporal filtering (MATF). The non-MC filter block 504 may comprise at least one of: an IIR filter, and a FIR filter. The non-MC filter block 504 may comprise a 3-tap FIR filter, for example. The non-MC filter block 504 may be enabled to receive a next input picture In(1) from a video source. The non-MC filter block 504 may be enabled to receive a current input picture In(0), a previous input picture In(−1) and a previous output of an IIR filter within the non-MC filter block 504 from the memory 506, and to generate an output signal (non MC out) to the blend block 508 and a current IIR filter output to the memory 506.

The memory 506 may comprise suitable logic, circuitry, and/or code that may be enabled to store at least a portion of consecutive video pictures. The memory 506 may be enabled to store a current input picture In(0), a previous input picture In(−1), and a previous output of an IIR filter within the non-MC filter block 504. The memory 506 may be enabled to receive a current output picture from the blend block 508 and the next input picture In(1) from a video source. The blend block 508 may be substantially as described in FIG. 5A.

Figure 5C:
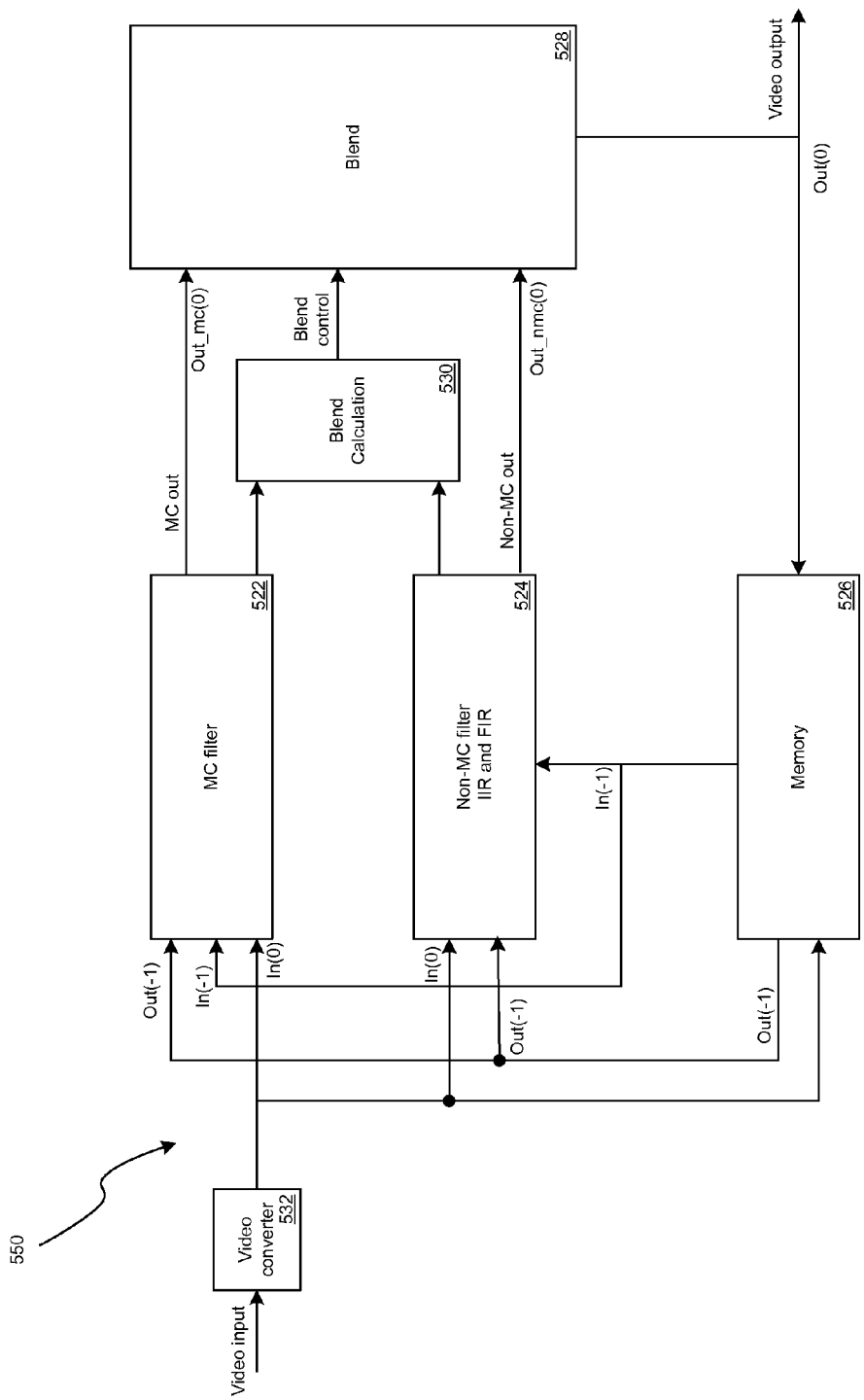
FIG. 5C is a block diagram illustrating an exemplary motion compensated temporal filtering system using both 2-tap finite impulse response (FIR) and infinite impulse response (IIR) filtering, in accordance with an embodiment of the invention.

FIG. 5C is another block diagram illustrating exemplary motion compensated temporal filtering system using both 2-tap finite impulse response (FIR) and infinite impulse response (IIR) filtering, in accordance with an embodiment of the invention. Referring to FIG. 5C, there is shown a MCTF system 550 that comprises a video converter 532, a motion compensated (MC) filter block 522, a non-MC filter block 524, a memory 526, a blend calculation block 530, and a blend block 528.

The video converter 532 may comprise suitable logic, circuitry and/or code that may be enabled to receive video data from a video source in YCbCr 4:2:2 format, for example. The video converter 532 may be enabled to convert the received video data to YCbCr in the 4:4:4 format before motion estimation and motion compensation operations are performed to facilitate motion estimation and motion compensation of chroma components. The chroma samples may be interpolated to the same sample density as the luma samples. The 4:2:2 to 4:4:4 interpolation may utilize a 4-tap filter, for example. The even indexed 4:4:4 chroma pixels may be generated from the half-value indexed 4:2:2 chroma samples. The odd indexed 4:4:4 chroma samples may be interpolated using four 4:2:2 chroma samples, for example, two to the left and two to the right of the current position.

The MC filter block 522 may comprise suitable logic, circuitry and/or code that may be enabled to perform motion compensation, motion estimation, and temporal filtering operation on the incoming video data. The MC filter block 522 may be enabled to receive a previous input picture In(−1), a previous output picture Out(−1) from memory 526, and a current input picture In(0) from the video converter 532. The MC filter block 522 may be enabled to utilize the received previous input picture In(−1), a previous output picture Out(−1) from memory 526, and a current input picture In(0) from the video converter 532 to generate a current output signal Out_mc(0) to the blend block 528 and the blend calculation block 530.

The non-MC filter block 524 may comprise suitable logic, circuitry and/or code that may be enabled to perform motion adaptive temporal filtering (MATF). The non-MC filter block 524 may comprise at least one of: an IIR filter, and a FIR filter. The non-MC filter block 524 may be enabled to receive a current input picture In(0) from the video converter 532. The non-MC filter block 524 may be enabled to receive the previous input picture In(−1), and a previous output picture Out(−1) from the memory 526. The previous output picture Out(−1) may be recursively fed back to the non-MC filter block 524. The non-MC filter block 524 may be enabled to utilize the received previous input picture In(−1), a previous output picture Out(−1), and a current input picture In(0) to generate an output signal Out_nmc(0) to the blend block 528 and the blend calculation block 530.

The memory 526 may comprise suitable logic, circuitry, and/or code that may be enabled to store at least a portion of consecutive video pictures. The memory 526 may be enabled to store a previous input picture In(−1), and a previous output picture Out(−1). The memory 526 may be enabled to receive a current input picture In(0) from the video converter 532, and a current output picture Out(0) from the blend block 528.

The blend calculation block 530 may comprise suitable logic, circuitry and/or code that may be enabled to receive the output signals generated from the MC filter block 522 and the non-MC filter block 524 and generate a blend control signal to the blend block 528. The blend calculation block 530 may be enabled to blend together the 4:2:2 outputs of the MC filter block 522 and the non-MC filter block 524. The blend calculation block 530 may be enabled to generate a blend control variable that may depend at least in part on a confidence metric, which may represent the confidence that a MV may represent the motion of the content at the current pixel In(0). The MV selected for the MC operation may be referred to as MV#0, or the MV with the lowest measured cost.

The blend calculation block 530 may be enabled to estimate the confidence metric of MV#0 by utilizing a combination of three metrics. For example, a first metric (cost_MV#1−cost_MV#0), which indicates how better MV#0 is than the next lowest cost MV, a second metric (cost_zero_MV−cost_MV#0), which indicates how much better MV#0 is compared to the zero (0,0) vector, and a third metric may be the horizontal edge strength, edge_strength_adj. These three metrics may be combined as follows:

$$\text{confidence\_}mv = \max((\text{cost\_zero\_}MV - \text{cost\_}MV\#0), (\text{cost\_}MV\#1 - \text{cost\_}MV\#0)) \quad (11a)$$

$$\text{confidence} = \max(0, \text{confidence\_}mv - \text{edge\_strength\_adj}) \quad (11b)$$

The value cost MV#1 may not affect the result except when MV#0 is the zero MV, since for other cases of MV#0, (cost_zero_MV>=cost_MV#1) and (cost_zero_MV−cost_MV#0)>=(cost_MV#1−cost_MV#0). Therefore, the MV#1 may not be calculated except when MV#0=zero_MV. The motion estimation (ME) may be performed once for every non-overlapping pixel block of size 3×1, for example. For the 3 pixels in the pixel block (of 3×1), MV#0, MV#1 and the (0,0)-MV may be equal. The edge_strength_adj value may be computed once for every 3×1 pixel block, for example, and the same confidence value may be utilized for blending each of the 3 pixels in the pixel block. The confidence value may be processed through a non-linearity to generate a blending control variable blend_MC_NonMC. The non-linearity may be in the form of K4*(1−K5/(d*d)), where d=4*confidence/(size of window), for example, and K4 and K5 are parameters that may be set according to a degree of filtering corresponding to a noise level of an input video and/or the expectations of a subsequent encoder. The factor of 4 may be used to retain a certain precision for integer operations and may be substituted by a suitable constant.

The blend block 528 may comprise suitable logic, circuitry and/or code that may be enabled to receive a plurality of input signals: a MC out signal (Out_mc(0)), a blend control signal from the blend calculation block 530, and a non-MC out signal (Out_nmc(0)) from the non-MC filter block 524. The blend block may be enabled to generate a current output picture Out(0) utilizing the received signals: a MC out signal (Out_mc(0)), a blend control signal from the blend calculation block 530, and a non-MC out signal (Out_nmc(0)).

The output of the blend block 528 may be generated by blending the outputs of the MC filter block 522 (Out_mc(0)), and the output of the non-MC filter block 524 (Out_nmc(0)) as follows:

$$\text{Out}(0) = (\text{blend}_{mc\_nonmc} * \text{Out\_}mc(0) + (256 - \text{blend}_{mc\_nonmc}) * \text{Out\_}nmc(0) + 128)/256 \quad (12)$$

The blending factor $\text{blend}_{mc\_nonmc}$ may be utilized for the three luma pixels in a 3×1 block, for example. The chroma blending may be performed for the 4:2:2 format or the even indexed chroma samples may be blended.

The blending factor for the non MC path and the MC path including non-linearities may be calculated as follows:

$$m = \frac{4 * \text{confidence}}{\text{me\_window\_size\_w} * \text{me\_window\_size\_h}} \quad (13a)$$

$$\text{blend}_{mc\_nonmc} = K_{mc\_nonmc,0}\left(1 - \frac{K_{mc\_nonmc,1}}{m^2}\right) \quad (13b)$$

$$\text{blend}_{mc\_nonmc} = \text{clip3}(\text{blend}_{mc\_nonmc}, 0, 256) \quad (13c)$$

where $K_{mc\_nonmc,0}$ and $K_{mc\_nonmc,1}$ are parameters that may be set according to the desired degree of filtering corresponding to the noise level of the input video and/or the expectations of the subsequent encoder and the function clip3( ) may be defined as follows:

```
int clip3(int x, int y, int z)
{
    if(x<y) return y;
    else if(x>z) return z;
    else return x;
}
```

Combining equations (11b) and (13a), the normalized confidence value may be approximated as follows:

$$m >> \max(0, (a_0 * (\text{confidence\_}mv\text{-edge\_strnegth\_adj})) >> 10) \quad (13d)$$

where $$a_0 = ((4*1024)/(me\_\text{window\_size\_}w * me\_\text{window\_size\_}h)) \quad (13e)$$

In the above implementation, a0 may be a programmable unsigned integer value, for example, since the window size may be programmable. The constants in equations (13d) and (13e) may be set to facilitate fixed point operations; they are not a restriction for the invention.

Figure 5D:
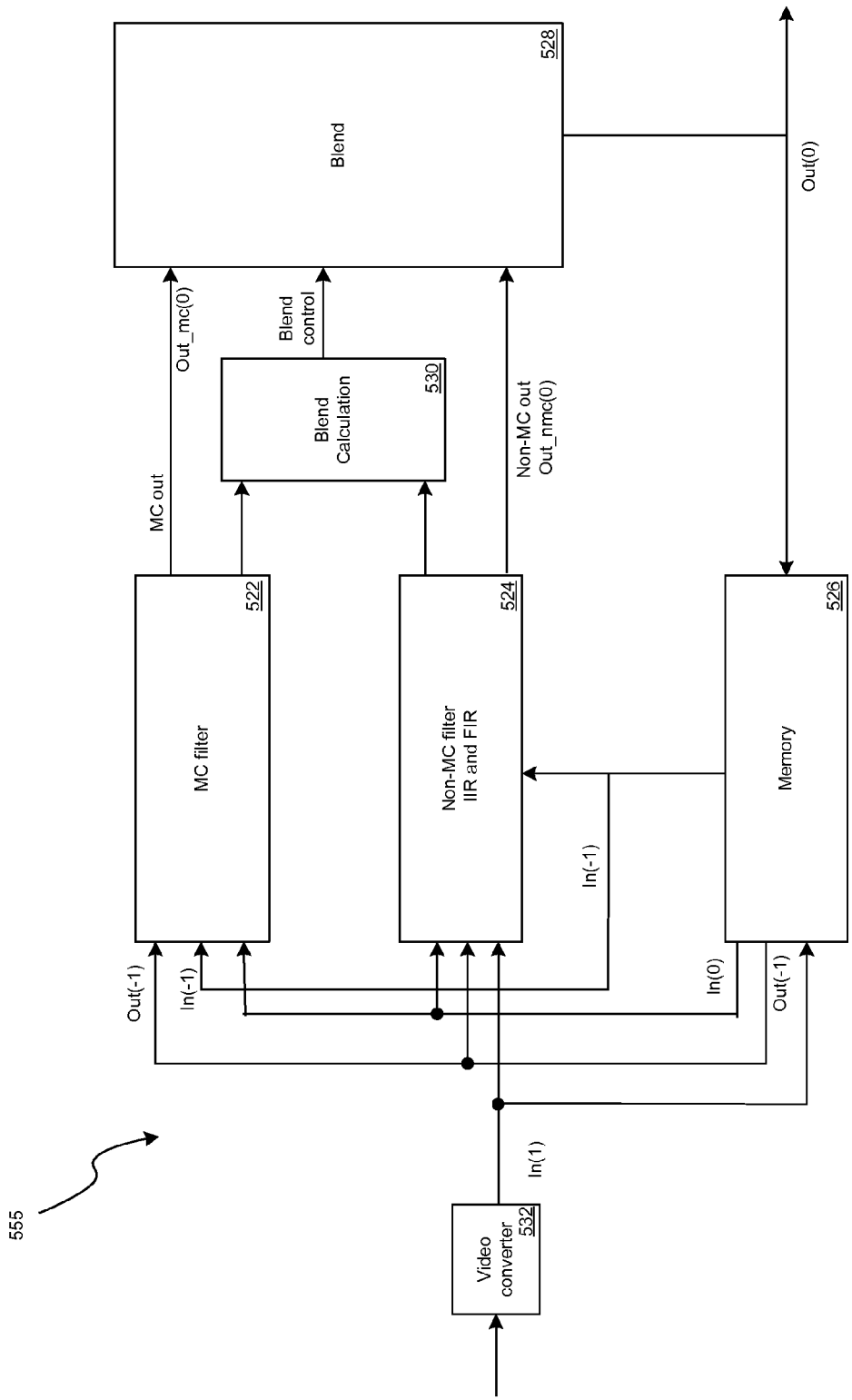
FIG. 5D is another block diagram illustrating an exemplary motion compensated temporal filtering system using both 3-tap finite impulse response (FIR) and infinite impulse response (IIR) filtering, in accordance with an embodiment of the invention.

FIG. 5D is another block diagram illustrating an exemplary motion compensated temporal filtering system using both 3-tap finite impulse response (FIR) and infinite impulse response (IIR) filtering, in accordance with an embodiment of the invention. Referring to FIG. 5D, there is shown a MCTF system 555 that comprises a video converter 532, a motion compensated (MC) filter block 522, a non-MC filter block 524, a memory 526, a blend calculation block 530, and a blend block 528.

The video converter 532 and the MC filter block 522 may be substantially as described in FIG. 5C. The MC filter block 522 may be enabled to receive a previous input picture In(−1), a previous output picture Out(−1) from memory 526, and a current input picture In(0). The MC filter block 522 may be enabled to utilize the received previous input picture In(−1), a previous output picture Out(−1), and a current input picture In(0) to generate a current output signal Out_mc(0) to the blend block 528 and the blend calculation block 530.

The non-MC filter block 524 may comprise suitable logic, circuitry and/or code that may be enabled to perform motion adaptive temporal filtering (MATF). The non-MC filter block 524 may comprise at least one of: an IIR filter, and a FIR filter. The non-MC filter block 524 may be enabled to receive a next input picture In(1) from the video converter 532. The non-MC filter block 524 may be enabled to receive the previous input picture In(−1), a current input picture In(0) and a previous output picture Out(−1) from the memory 526. The previous output picture Out(−1) may be recursively fed back to the non-MC filter block 524. The non-MC filter block 524 may be enabled to utilize the received previous input picture In(−1), a previous output picture Out(−1), a current input picture In(0), and a next input picture In(1) to generate an output signal Out_nmc(0) to the blend block 528 and the blend calculation block 530.

The memory 526 may comprise suitable logic, circuitry, and/or code that may be enabled to store at least a portion of consecutive video pictures. The memory 526 may be enabled to store a previous input picture In(−1), a current input picture In(0), and a previous output picture Out(−1). The memory 526 may be enabled to receive a next input picture In(1) from the video converter 532, and a current output picture Out(0) from the blend block 528. The blend calculation block 530 and the blend block 528 may be substantially as described in FIG. 5C.

Figure 5E:
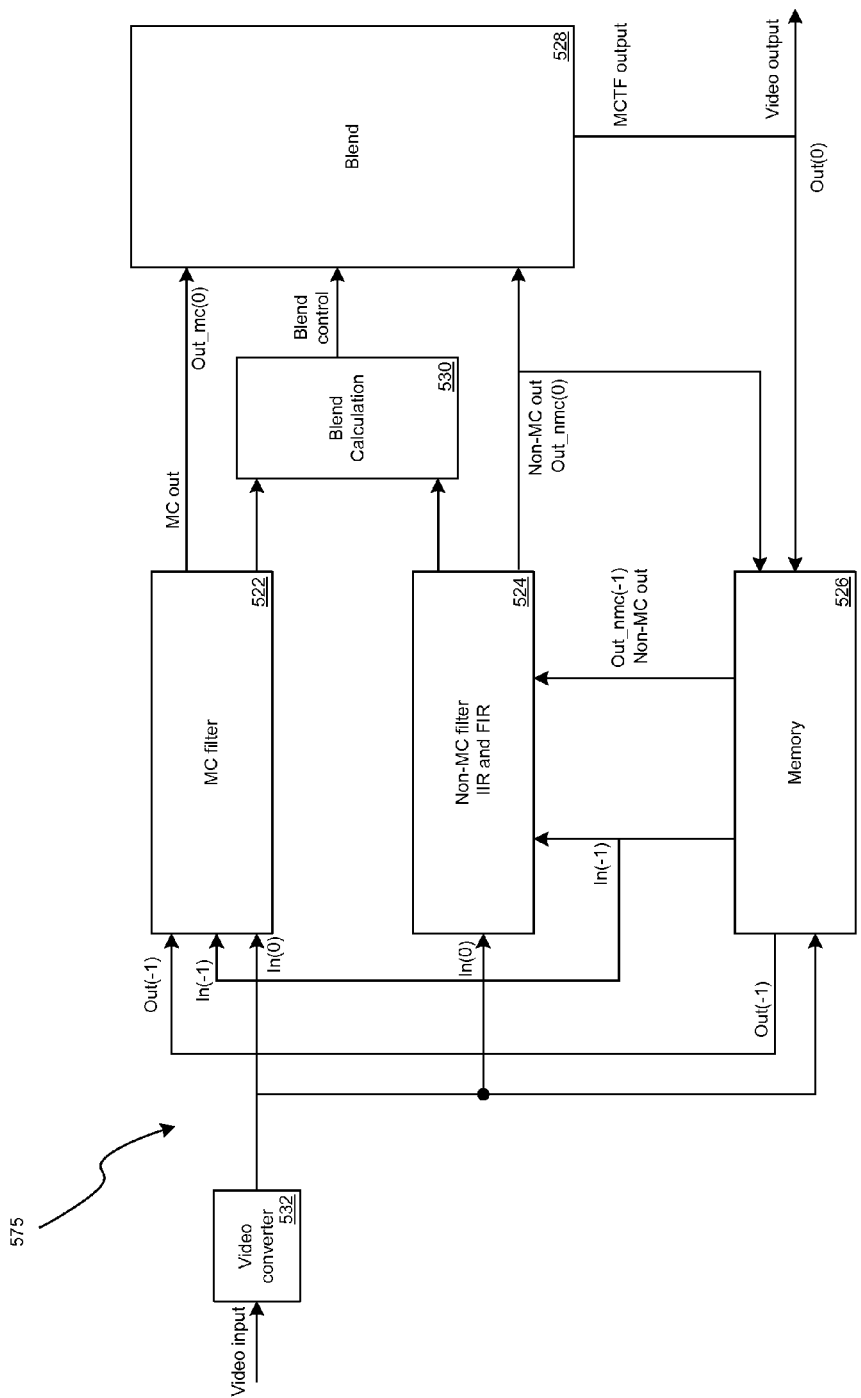
FIG. 5E is a block diagram of an alternative embodiment illustrating exemplary motion compensated temporal filtering system using both finite impulse response (FIR) and infinite impulse response (IIR) filtering, in accordance with an embodiment of the invention.

FIG. 5E is a block diagram of an alternative embodiment illustrating exemplary motion compensated temporal filtering system using both finite impulse response (FIR) and infinite impulse response (IIR) filtering, in accordance with an embodiment of the invention. Referring to FIG. 5E, there is shown a MCTF system 575 that comprises a video converter 532, a motion compensated (MC) filter block 522, a non-MC filter block 524, a memory 526, a blend calculation block 530, and a blend block 528.

The non-MC path block 524 may be enabled to receive a current input picture In(0) from the video converter 532. The non-MC path block 524 may be enabled to receive the previous input picture In(−1), and a previous non MC output signal (Out_nm c(−1)) from the memory 526. The previous non MC output signal (Out_nmc(−1)) may be recursively fed back to the non-MC filter block 522. Such feedback of the non-MC output (Out_nm c(−1)) to the non-MC path block 524 may utilize additional memory bandwidth compared to the embodiment illustrated in FIG. 5D. The non-MC filter block 524 may be enabled to utilize the received previous input picture In(−1), a previous non MC output signal (Out_nmc(−1)), and a current input picture In(0) to generate an output signal Out_nmc(0) to the blend block 528 and the blend calculation block 530.

In accordance with an embodiment of the invention, a 2-tap FIR filter may be utilized in the non-MC filter block 524 to process the current and previous unfiltered picture pictures, for example, as illustrated in FIGS. 4A, 4B, and 4D. Such embodiments may utilize less logic and less memory bandwidth than some other embodiments described herein.

The memory 526 may be enabled to store a previous input picture In(−1), a previous output picture Out(−1), and a previous non MC output signal (Out_nm c(−1)). The memory 526 may be enabled to receive a current input picture In(0) from the video converter 532, a current non-MC output signal (Out_nmc(0)) and a current output picture Out(0) from the blend block 528.

Figure 6A:
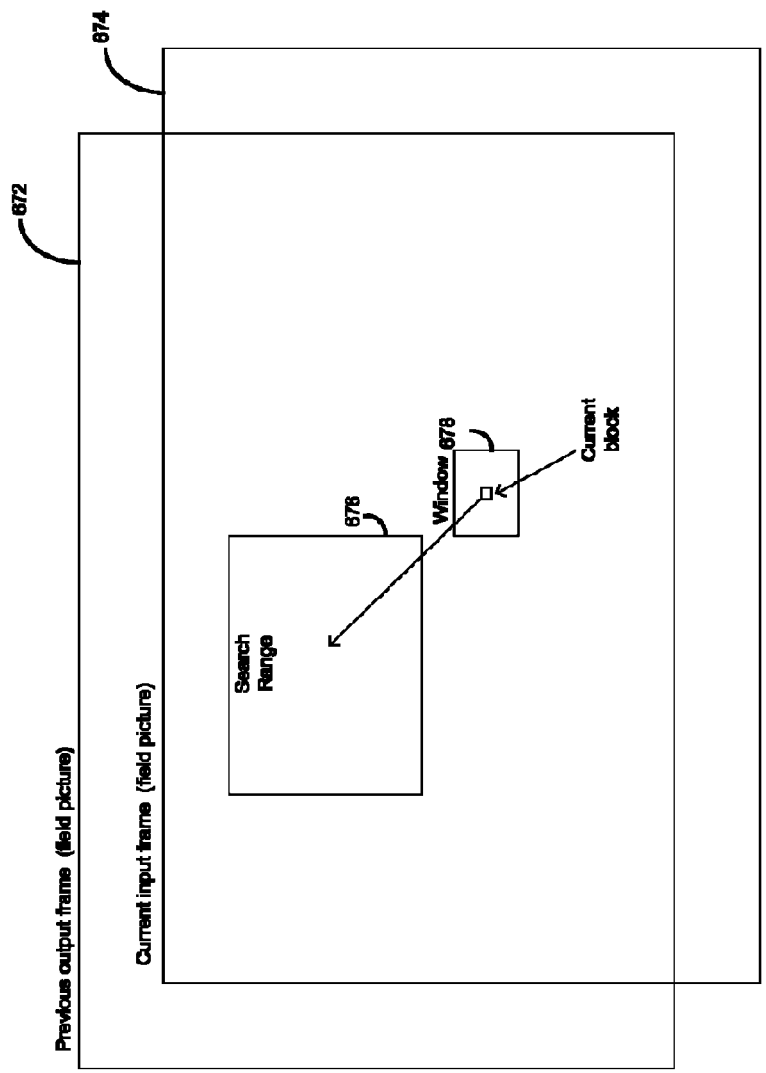
FIG. 6A is a block diagram of an exemplary motion estimation method in the motion compensated temporal filtering (MCTF) system for MC path, in accordance with an embodiment of the invention.

FIG. 6A is a block diagram of an exemplary motion estimation method in the motion compensated temporal filtering (MCTF) system for MC path, in accordance with an embodiment of the invention. Referring to FIG. 6A, there is shown a previous output picture Out(−1) 672, a current input picture In(0) 674, a search range block 676, and a window block 678. In embodiments utilizing picture processing, 672 may be a previous output picture, and 674 may be a current input picture.

In operation, the MC path of the MCTF may perform motion estimation (ME) to determine a motion vector (MV) to represent motion of image content at each current pixel block. The confidence of the validity of the resulting motion vector may be determined. Motion compensation of each current pixel may be performed from the previous MCTF output image in the search range 676 of previous output picture Out(−1)672 by utilizing a motion vector. The amount of residual signal and noise after motion compensation may be measured at each pixel. The MCTF may include performing IIR temporal filtering of the input image or current input picture In(0) 674 in conjunction with the motion compensated previous output image or previous output picture Out(−1). The IIR filter may be controlled by the measurement of the MC residual after processing by a non-linear transfer function.

Figure 6B:
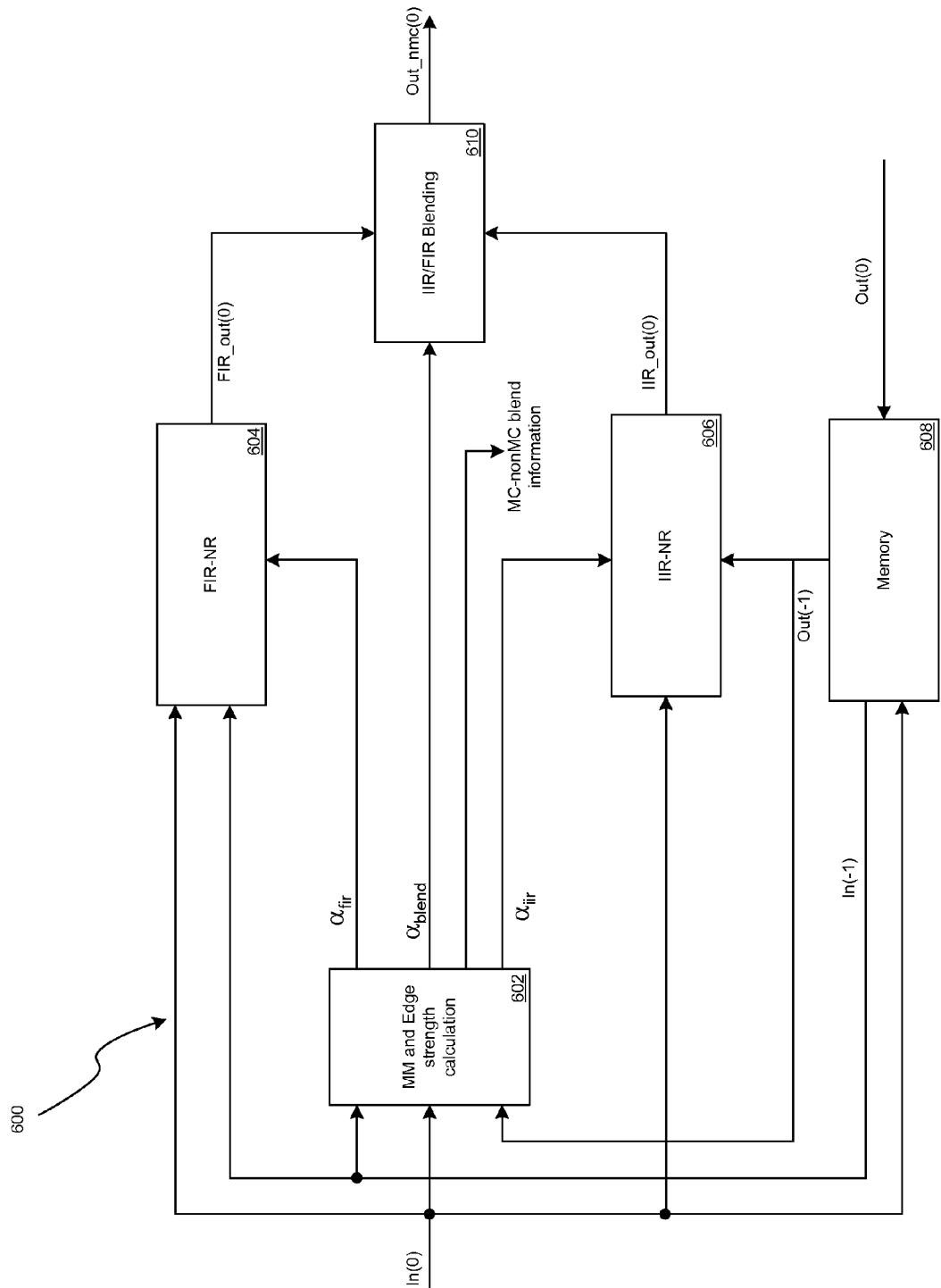
FIG. 6B is a block diagram of a non-MC path of an exemplary motion compensated temporal filtering system using both finite impulse response (FIR) and infinite impulse response (IIR) filtering for the non-MC path, in accordance with an embodiment of the invention.

FIG. 6B is a block diagram of a non-MC path of an exemplary motion compensated temporal filtering system using both finite impulse response (FIR) and infinite impulse response (IIR) filtering for the non-MC path, in accordance with an embodiment of the invention. Referring to FIG. 6B there is shown a non-MC filter module 600 that comprises a motion metric (MM) and edge calculation block 602, a FIR noise-reduction (FIR-NR) block 604, an IIR noise reduction (IIR-NR) block 606, a memory 608, and an IIR/FIR blending block 610.

The MM and edge strength calculation block 602 may comprise suitable logic, circuitry, and/or code that may be enabled to determine a motion metric (MM) parameter based on contents from at least one of the previous input picture In(−1), a previous output picture Out(−1), and a current input picture In(0). The MM and edge strength calculation block 602 may be enabled to generate a different MM parameter for each of the filtering modes supported by the FIR-IIR blended filtering system. For example, when the FIR-IIR blended filtering system supports an FIR filtering mode, an IIR filtering mode, and an adaptive FIR-IIR filtering mode, the MM and edge strength calculation block 602 may be enabled to determine three different MM parameters. The MM and edge strength calculation block 602 may also be enabled to generate one MM parameter for all the filtering modes supported by the FIR-IIR blended filtering system. The MM and edge strength calculation block 602 may be enabled to generate an FIR blending factor, $\alpha_{fir}$, an IIR blending factor, $\alpha_{iir}$, and/or an FIR-IIR blending factor, $\alpha_{blend}$. The MM and edge strength calculation block 602 may generate the blending factors based on the MM parameter for the filtering mode selected, for example.

The MM parameter generated by the MM and edge strength calculation block 602 may comprise a luminance (Y) component, $MM_Y(x,y)$, and two chrominance (Cb, Cr) components, $MM_{Cb}(x,y)$ and $MM_{Cr}(x,y)$. When one MM parameter is used for all filtering modes in the FIR-IIR blending filtering mode, the MM parameter may be determined based on the expression:

$$MM(x,y) = w0 * MM_Y(x,y) + w1 * MM_{Cb}(x,y) + w2 * MM_{Cr}(x,y), \quad (14a)$$

where $$MM_Y(x,y) = \frac{4}{w*h} \sum_{(i,j) \text{ in the } w \times h \text{ neighbor of}(x,y)} |In_Y^{(0)}(i,j) - Out_Y^{(-1)}(i,j)|$$

$$MM_{Cb}(x,y) = \frac{4}{w*h} \sum_{(i,j) \text{ in the } w \times h \text{ neighbor of}(x,y)} |In_{Cb}^{(0)}(i,j) - Out_{Cb}^{(-1)}(i,j)|$$

$$MM_{Cr}(x,y) = \frac{4}{w*h} \sum_{(i,j) \text{ in the } w \times h \text{ neighbor of}(x,y)} |In_{Cr}^{(0)}(i,j) - Out_{Cr}^{(-1)}(i,j)|$$

where w and h are the width and height of a window or neighborhood around the picture location (x,y), i and j may correspond to indices that may be utilized to identify the location of the pixels in the pictures in the neighborhood, w0, w1, w2 are suitable weighting factors, $In_Y^{(0)}(i,j)$ is the current input luminance picture, $Out_Y^{(-1)}(i,j)$ is the previous output luminance picture, $In_Y^{(0)}(i,j)$ is the current input chrominance picture, $Out_Y^{(-1)}(i,j)$ is the previous output chrominance picture, $In_Y^{(0)}(i,j)$ is the current input chrominance picture, and $Out_Y^{(-1)}(i,j)$ is the previous output chrominance picture. The neighborhood size may be determined by taking into consideration the effect on moving impulses, generally thin edges, and/or the effect on smoothing out noise, for example. Some exemplary neighborhood sizes may be 3×3, 5×3, 3×5, 7×3, 5×5, 7×5, and 7×7, for example. Selection of a neighborhood size may depend, at least in part, on implementation requirements.

The factor of 4 may be used to obtain a certain degree of precision for integer operations and may be substituted by a suitable constant. Notwithstanding, other suitable constants may be utilized for precision for integer operations. The divisions by (w*h) may be avoided when they are associated with the weighting factors w0, w1 and w2 in equation (11). For example, if (w0, w1, w2) is set to be (2048, 1024, 1024)/4096, then for a window size of 7×5, equation (11) may be approximated as follows:

$$MM(x,y) = (59*MM_L(x,y) + 29*MM_{Cb}(x,y) + 29*MM_{Cr}(x,y))/4096 \quad (14b)$$

where the corresponding component metrics may be calculated as follows:

$$MM_L(x,y) = 4 \sum_{(i,j) \text{ in the } w \times h \text{ neighbor of}(x,y)} |In_L^{(0)}(i,j) - Out_L^{(-1)}(i,j)|$$

$$MM_{Cb}(x,y) = 4 \sum_{(i,j) \text{ in the } w \times h \text{ neighbor of}(x,y)} |In_{Cb}^{(0)}(i,j) - Out_{Cb}^{(-1)}(i,j)|$$

$$MM_{Cr}(x,y) = 4 \sum_{(i,j) \text{ in the } w \times h \text{ neighbor of}(x,y)} |In_{Cr}^{(0)}(i,j) - Out_{Cr}^{(-1)}(i,j)|$$

The factor of 4096 may be used for precision for integer operations and may be substituted by a suitable constant.

The MM and edge strength calculation block 602 may be enabled to generate the blending factors $\alpha_{fir}$, $\alpha_{iir}$, and $\alpha_{blend}$ based on the following expression:

$$\alpha = K_0(1 - (K_1/MM^2)), \quad (15)$$

where $K_0$ and $K_1$ are factors determined for each of the blending factors and MM is the MM parameter determined in equation (8) for a selected filtering mode. For example, the factors $K_{0, FIR}$ and $K_{1, FIR}$ may be utilized to determine $\alpha_{fir}$, the factors $K_{0, IIR}$ and $K_{1, IIR}$ may be utilized to determine $\alpha_{iir}$, and the factors $K_{0, blend}$ and $K_{1, blend}$ may be utilized to determine $\alpha_{blend}$. The non-linearity of equation (9) may enable the blending factors to increase more rapidly as the MM parameter increases and avoid artifacts such as motion blurriness or motion trails for moving objects, for example. Moreover, the non-linear behavior of the blending factors may allow moving content to retain its sharpness.

The memory 608 may comprise suitable logic, circuitry, and/or code that may be enabled to store at least a portion of consecutive video pictures. The memory 608 may be enabled to store a previous input picture In(−1), and a previous output picture Out(−1).

The FIR-NR block 604 may comprise suitable logic, circuitry, and/or code that may be enabled to generate an FIR-blended current output picture FIR_out(0) by utilizing a received current input picture In(0), a previous input picture In(−1) and the FIR blending factor, $\alpha_{fir}$. The FIR blending factor, $\alpha_{fir}$, may be generated by the MM and edge strength calculation block 602. The FIR-blended next output picture FIR_out(0), may be generated in accordance with the following expression:

$$\text{FIR\_out}(0) = \alpha_{fir} \times \text{In}(0) + (1 - \alpha_{fir}) \times \text{FIR}_{2tap}(0) \quad (16)$$

where $$\text{FIR}_{2tap}(0) = c_0 \times \text{In}(-1) + c_1 \times \text{In}(0) \quad (17)$$

and $c_0$ and $c_1$ are suitable constants.

The IIR-NR block 606 may comprise suitable logic, circuitry, and/or code that may be enabled to generate an IIR-blended current output picture IIR_out(0) by utilizing a received current input picture In(0), a previous output picture Out(−1) and the IIR blending factor, $\alpha_{iir}$, generated by the MM and edge strength calculation block 602. The IIR-blended current output picture IIR_out(0), may be generated in accordance with the following expression:

$$\text{IIR\_out}(0) = \alpha_{iir} \times \text{In}(0) + (1-\alpha_{iir}) \times \text{Out}(-1) \quad (18)$$

The FIR-IIR blending block 610 may comprise suitable logic, circuitry, and/or code that may be enabled to receive the FIR-blended current output picture FIR_out(0) from the FIR-NR block 604 and the IIR-blended current output picture IIR_out(0) from the IIR-NR block 606 and generate a filtered output signal Out_nmc(0). In this regard, the FIR-IIR blending block 610 may utilize the FIR-IIR blending factor, $\alpha_{blend}$, generated by the MM and edge strength calculation block 602. The filtered output signal Out_nmc(0), may be generated in accordance with the following expression:

$$\text{Out\_nmc}(0) = \alpha_{blend} \times \text{FIR\_out}(0) + \alpha_{blend} \times \text{IIR\_out}(0) \quad (19)$$

The adaptive FIR-IIR blending factor, $\alpha_{blend}$ blends the values of the FIR-blended current output picture FIR_out(0) and the IIR-blended current output picture IIR_out(0).

In operation, the MM and edge strength calculation block 602 may determine the MM parameters based on the filtering mode selected and may generate the blending factors $\alpha_{fir}$, $\alpha_{iir}$, and $\alpha_{blend}$. The MM and edge strength calculation block 602 may transfer the corresponding blending factor to the FIR-NR block 604, the IIR-NR block 606, and the FIR-IIR blending block 610. The FIR-NR block 604 may generate the FIR-blended current output picture FIR_out(0) based on the FIR blending factor, $\alpha_{fir}$. The IIR-NR block 606 may generate the IIR-blended current output picture IIR_out(0), based on the IIR blending factor, $\alpha_{iir}$. The FIR-IIR blending block 610 may receive the FIR-blended current output picture FIR_out(0) and the IIR-blended current output picture IIR_out(0) and may generate the filtered output signal Out_nmc(0) by utilizing the adaptive FIR-IIR blending factor, $\alpha_{blend}$ generated by the MM and edge strength calculation block 602.

Figure 6C:
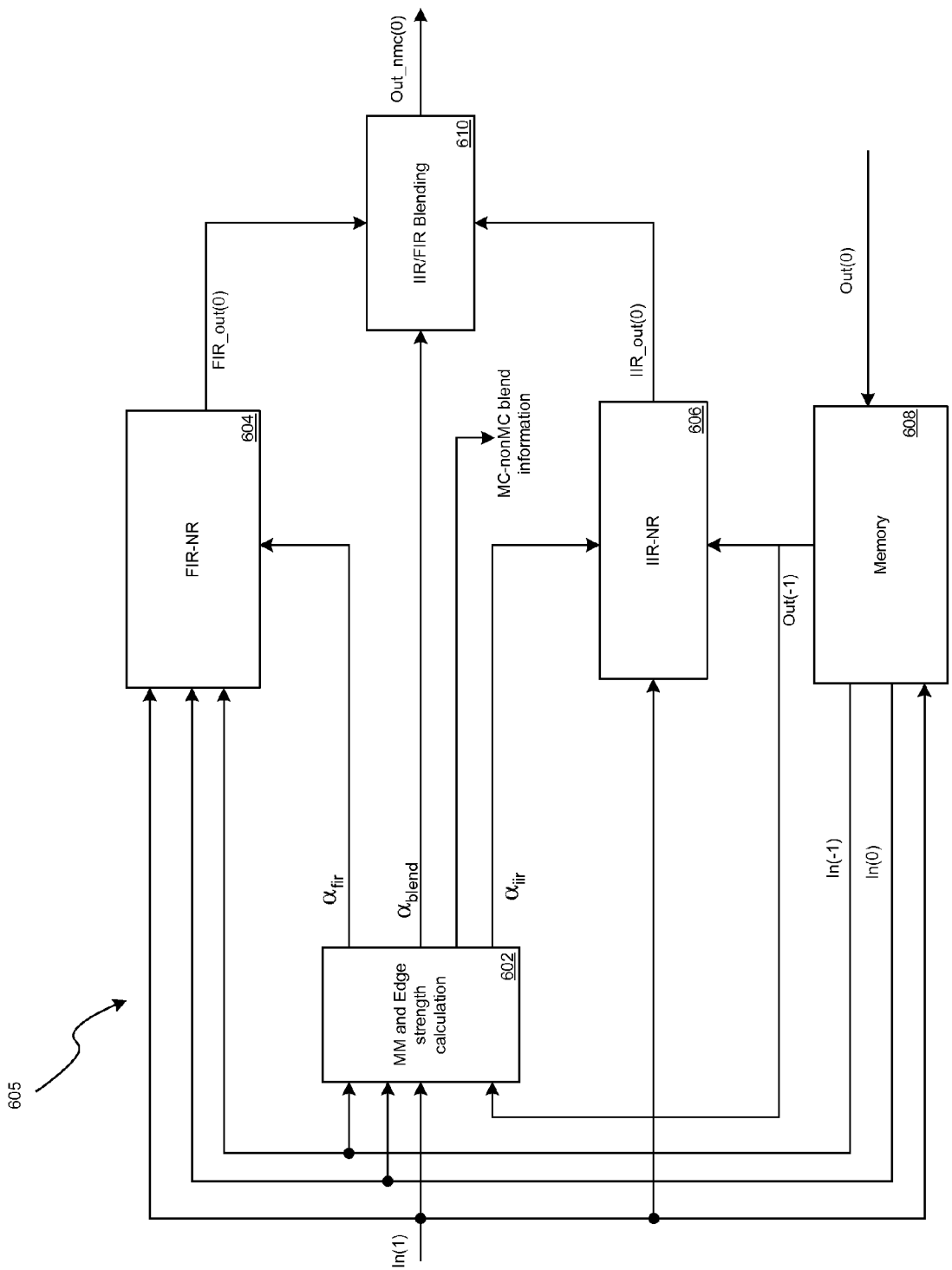
FIG. 6C is a block diagram of a non-MC path of an exemplary motion compensated temporal filtering system using both 3-tap finite impulse response (FIR) and infinite impulse response (IIR) filtering for non-MC path, in accordance with an embodiment of the invention.

FIG. 6C is a block diagram of a non-MC path of an exemplary motion compensated temporal filtering system using both 3-tap finite impulse response (FIR) and infinite impulse response (IIR) filtering for non-MC path, in accordance with an embodiment of the invention. Referring to FIG. 6C there is shown a non-MC filter module 605 that comprises a motion metric (MM) and edge calculation block 602, a FIR noise-reduction (FIR-NR) block 604, an IIR noise reduction (IIR-NR) block 606, a memory 608, and an IIR/FIR blending block 610.

The MM and edge strength calculation block 602 may comprise suitable logic, circuitry, and/or code that may be enabled to determine a motion metric (MM) parameter based on contents from at least one of the previous input picture In(−1), a previous output picture Out(−1), a current input picture In(0), and a next input picture In(1). The MM and edge strength calculation block 602 may be enabled to generate a different MM parameter for each of the filtering modes supported by the FIR-IIR blended filtering system. For example, when the FIR-IIR blended filtering system supports an FIR filtering mode, an IIR filtering mode, and an adaptive FIR-IIR filtering mode, the MM and edge strength calculation block 602 may be enabled to determine three different MM parameters. The MM and edge strength calculation block 602 may also be enabled to generate one MM parameter for all the filtering modes supported by the FIR-IIR blended filtering system. The MM and edge strength calculation block 602 may be enabled to generate an FIR blending factor, $\alpha_{fir}$, an IIR blending factor, $\alpha_{iir}$, and/or an FIR-IIR blending factor, $\alpha_{blend}$. The MM and edge strength calculation block 602 may generate the blending factors based on the MM parameter for the filtering mode selected, for example.

The MM parameter generated by the MM and edge strength calculation block 602 may comprise a luminance (Y) component, $MM_Y(x,y)$, and two chrominance (Cb, Cr) components, $MM_{Cb}(x,y)$ and $MM_{Cr}(x,y)$. In the example of using one MM parameter for all filtering modes in the FIR-IIR blending filtering mode, the MM parameter may be determined based on the expression:

$$MM(x,y) = w0 * MM_Y(x,y) + w1 * MM_{Cb}(x,y) + w2 * MM_{Cr}(x,y) \quad (14a)$$

where $$MM_Y(x,y) = \frac{2}{w*h} \sum_{(i,j) \text{in the } w \times h \text{ neighborhood of}(x,y)} (|In_Y^{(0)}(i,j) - Out_Y^{(-1)}(i,j)| + |In_Y^{(0)}(i,j) - In_Y^{(1)}(i,j)|)$$

$$MM_{Cb}(x,y) = \frac{2}{w*h} \sum_{(i,j) \text{in the } w \times h \text{ neighborhood of}(x,y)} (|In_{Cb}^{(0)}(i,j) - Out_{Cb}^{(-1)}(i,j)| + |In_{Cb}^{(0)}(i,j) - In_{Cb}^{(1)}(i,j)|)$$

$$MM_{Cr}(x,y) = \frac{2}{w*h} \sum_{(i,j) \text{in the } w \times h \text{ neighborhood of}(x,y)} (|In_{Cr}^{(0)}(i,j) - Out_{Cr}^{(-1)}(i,j)| + |In_{Cr}^{(0)}(i,j) - In_{Cr}^{(1)}(i,j)|)$$

where w and h are the width and height of a window or neighborhood around the picture location (x,y), i and j may correspond to indices that may be utilized to identify the location of the pixels in the pictures in the neighborhood, w0, w1, w2 are suitable weighting factors, $In_Y^{(1)}(i,j)$ is the next input luminance picture, $In_Y^{(0)}(i,j)$ is the current input luminance picture, $Out_Y^{(-1)}(i,j)$ is the next output luminance picture, $In_{Cb}^{(1)}(i,j)$ is the next input chrominance picture, $In_{Cb}^{(1)}(i,j)$ is the current input chrominance picture, $Out_{Cb}^{(-1)}(i,j)$ is the next output chrominance picture, $In_{Cr}^{(1)}(i,j)$ is the next input chrominance picture, $In_{Cr}^{(0)}(i,j)$ is the current input chrominance picture, and $Out_{Cr}^{(-1)}(i,j)$ is the next output chrominance picture. The neighborhood size may be determined by taking into consideration the effect on moving impulses, generally thin edges, and/or the effect on smoothing out noise, for example. Some exemplary neighborhood sizes may be 3×3, 5×3, 3×5, 7×3, 5×5, 7×5, and 7×7, for example. Selection of a neighborhood size may depend, at least in part, on implementation requirements.

The MM and edge strength calculation block 602 may be enabled to generate the blending factors $\alpha_{fir}$, $\alpha_{iir}$, and $\alpha_{blend}$ based on the following expression:

$$\alpha = K_0(1 - (K_1/MM^2)), \quad (15)$$

where $K_0$ and $K_1$ are factors determined for each of the blending factors and MM is the MM parameter determined in equation (8) for a selected filtering mode. For example, the factors $K_{0, FIR}$ and $K_{1, FIR}$ may be utilized to determine $\alpha_{fir}$, the factors $K_{0, IIR}$ and $K_{1, IIR}$ may be utilized to determine $\alpha_{iir}$, and the factors $K_{0, blend}$ and $K_{1, blend}$ may be utilized to determine $\alpha_{blend}$. The non-linearity of equation (9) may enable the blending factors to increase more rapidly as the MM parameter increases and avoid artifacts such as motion blurriness or motion trails for moving objects, for example. Moreover, the non-linear behavior of the blending factors may allow moving content to retain its sharpness.

The memory 608 may comprise suitable logic, circuitry, and/or code that may be enabled to store at least a portion of consecutive video pictures. The memory 608 may be enabled to store a previous input picture In(−1), a current input picture In(0), and a previous output picture Out(−1).

The FIR-NR block 604 may comprise suitable logic, circuitry, and/or code that may be enabled to generate an FIR-blended current output picture FIR_out(0) by utilizing a received next input picture In(1), a current input picture In(0), a previous input picture In(−1) and the FIR blending factor, $\alpha_{fir}$. The FIR blending factor, $\alpha_{fir}$ may be generated by the MM and edge strength calculation block 602. The FIR-blended next output picture FIR_out(0), may be generated in accordance with the following expression:

$$FIR\_out(0) = \alpha_{fir} \times In(1) + (1 - \alpha_{fir}) \times FIR_{3tap}(0) \quad (16)$$

where $$FIR_{3tap}(0) = c_0 \times In(-1) + c_1 \times In(0) + c_2 \times In(1) \quad (17)$$

and $c_0$, $c_1$ and $c_2$ are suitable constants.

The IIR-NR block 606 may comprise suitable logic, circuitry, and/or code that may be enabled to generate an IIR-blended current output picture IIR_out(0) by utilizing a received next input picture In(1), a previous output picture Out(−1) and the IIR blending factor, $\alpha_{iir}$, generated by the MM and edge strength calculation block 602. The IIR-blended current output picture IIR_out(0), may be generated in accordance with the following expression:

$$IIR\_out(0) = \alpha_{iir} \times In(1) + (1 - \alpha_{iir}) \times Out(-1) \quad (18b)$$

The FIR-IIR blending block 610 may be substantially as described in FIG. 6B.

In operation, the MM and edge strength calculation block 602 may determine the MM parameters based on the filtering mode selected and may generate the blending factors $\alpha_{fir}$, $\alpha_{iir}$, and $\alpha_{blend}$. The MM and edge strength calculation block 602 may transfer the corresponding blending factor to the FIR-NR block 604, the IIR-NR block 606, and the FIR-IIR blending block 610. The FIR-NR block 604 may generate the FIR-blended current output picture FIR_out(0) based on the FIR blending factor, $\alpha_{fir}$. The IIR-NR block 606 may generate the IIR-blended current output picture IIR_out(0), based on the IIR blending factor, $\alpha_{iir}$. The FIR-IIR blending block 610 may receive the FIR-blended current output picture FIR_out(0) and the IIR-blended current output picture IIR_out(0) and may generate the filtered output signal Out_nmc(0) by utilizing the adaptive FIR-IIR blending factor, $\alpha_{blend}$ generated by the MM and edge strength calculation block 602.

Figure 6D:
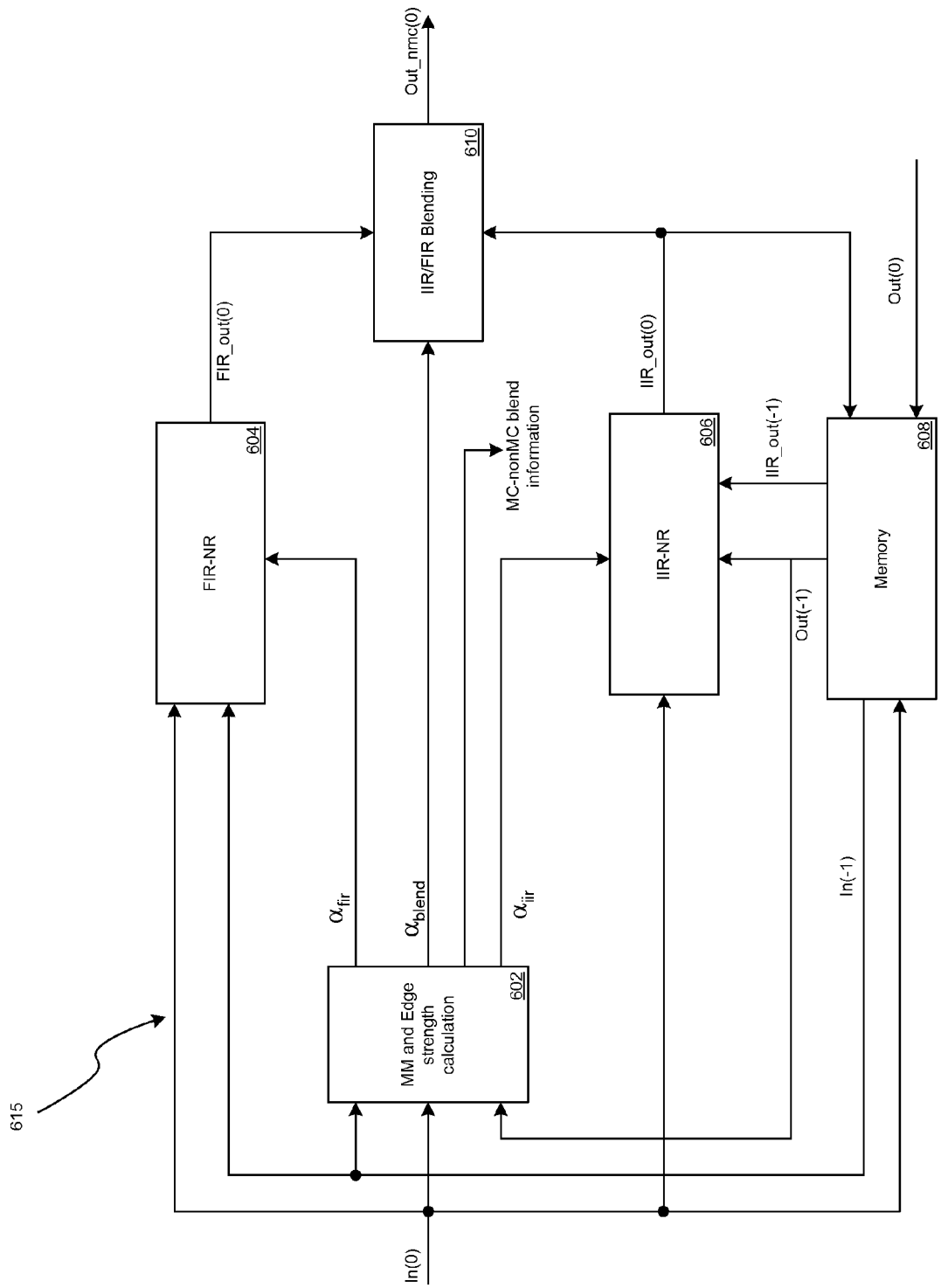
FIG. 6D is a block diagram of a non-MC path of another exemplary motion compensated temporal filtering system using both finite impulse response (FIR) and infinite impulse response (IIR) filtering for non-MC path with IIR filtering feedback, in accordance with an embodiment of the invention.

FIG. 6D is a block diagram of a non-MC path of another exemplary motion compensated temporal filtering system using both finite impulse response (FIR) and infinite impulse response (IIR) filtering for non-MC path with IIR filtering feedback, in accordance with an embodiment of the invention. Referring to FIG. 6D there is shown a non-MC filter module 615 that comprises a motion metric (MM) and edge calculation block 602, a FIR noise-reduction (FIR-NR) block 604, an IIR noise reduction (IIR-NR) block 606, a memory 608, and an IIR/FIR blending block 610. The blocks in FIG. 6D may be substantially as described in FIG. 6B.

The IIR-NR block 606 may comprise suitable logic, circuitry, and/or code that may be enabled to generate an IIR-blended current output picture IIR_out(0) by utilizing a received current input picture In(0), a previous output picture Out(−1), an IIR-blended previous output picture IIR_out(−1), and the IIR blending factor, $\alpha_{iir}$, generated by the MM and edge strength calculation block 602. After one video picture delay, the IIR-blended current output picture IIR_out(0) stored in the memory 608 may correspond to an IIR-filtered previous output picture pixel, IIR_out(−1).

Figure 6E:
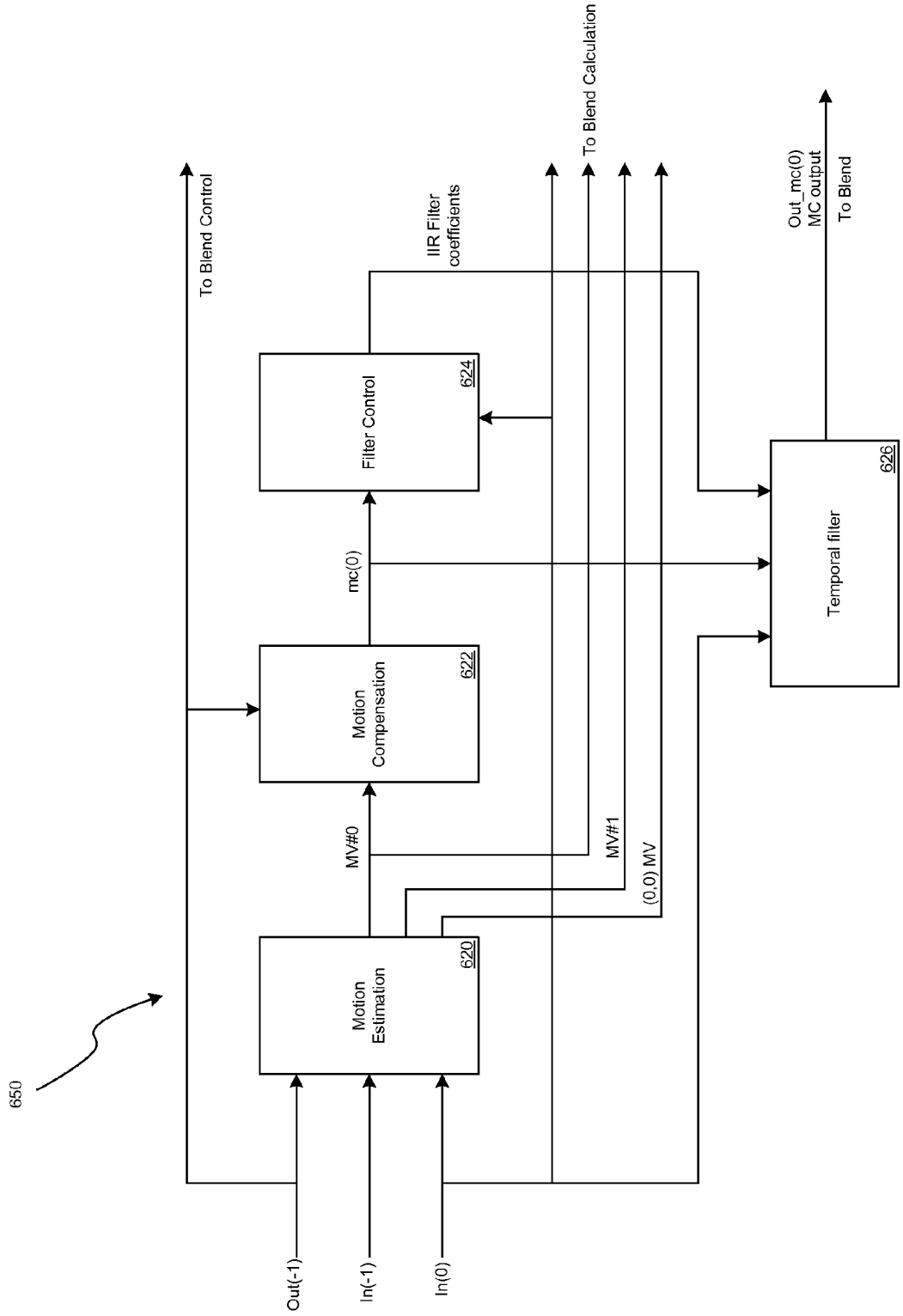
FIG. 6E is a block diagram of an exemplary MC path for a motion compensated temporal filtering system, in accordance with an embodiment of the invention.

FIG. 6E is a block diagram of an exemplary MC path for a motion compensated temporal filtering system, in accordance with an embodiment of the invention. Referring to FIG. 6E, there is shown a MC filter module 650 that comprises a motion estimation block 620, a motion compensation block 622, a filter control block 624, and a temporal filter block 626.

The motion estimation (ME) block 620 may comprise suitable logic, circuitry and/or code that may be enabled to search a previous MCTF output picture Out(−1) after being converted to the 4:4:4 format in the search range 676 to find a motion vector (MV) with a suitable fit, for example, lowest cost, with respect to a current input picture In(0) after being converted to the 4:4:4 format. Alternatively, the motion estimation function may be performed without converting the previous output or the current input to 4:4:4 format. Suitable interpolation may be applied to the chroma samples to enable the motion estimation function. The set of pixels that are assigned one MV may be referred to as a pixel block. A pixel block may be as small as 1×1, or one pixel, or it may be larger. For example, the pixel block size may be 3×1 i.e. 3 pixels wide and 1 pixel tall. A pixel block size larger than 1×1 may be chosen to reduce implementation complexity for motion estimation and motion compensation. The implementation cost of the ME function may be related to the inverse of the pixel block size. The motion estimation (ME) block 620 may be enabled to receive the previous output picture Out(−1), the previous input picture In(−1), and the current input picture In(0) and generate a plurality of motion vectors, MV#0 and MV#1, for example.

Each candidate motion vector may be evaluated using a cost metric measured over a window 678 of pixels. The size of the window 678 may be independent of the size of the pixel block. For example, the ME window size may be 7×5, i.e. 7 pixels wide and 5 pixels high. The ME block 620 may utilize a cost metric that may be a sum of absolute differences (SAD) for luma samples and sum of signed differences (SSD) for chroma samples. These cost metrics may be combined into one cost as follows, for example:

$$cost_{mc\_iir} = (2 \ast luma\_SAD + abs(Cb\_SSD) + abs(Cr\_SSD) + 2)/4 \quad (24a)$$

where Cb_SSD and Cr_SSD are the SSD values of Cb and Cr components respectively. Notwithstanding, the cost metric may also be denoted as follows: $cost_{mc\_iir} = (2 \ast luma\_SAD + Cb\_SAD + Cr\_SAD + 2)/4$, where Cb_SAD and Cr_SAD are the SAD values of Cb and Cr components respectively. Alternative cost metrics and combinations of cost metrics may be used. For example SAD may be used for both luma and chroma.

The weighting factors in equation (24a) may favor luma more than each chroma as luma may carry more information. The motion estimation block 620 may be enabled to search a reference picture, for example, Out(−1) within a search range 676. The motion estimation function may use a plurality of stages. The first stage of this search may include integer MV positions. The lowest and second lowest cost MV's may be determined, and they may be labeled as MV#0 and MV#1, respectively.

The cost metric for neighboring half-pixel position MV's with a +/−½ pixel MV offset with respect to the vector MV#0 may be determined. In accordance with an embodiment of the invention, eight neighboring half-pel positions may be searched. The lowest cost MV and the second lowest cost MV may be updated during the half-pel search. The updated lowest cost MV and second lowest cost MV may be labeled as MV#0 and MV#1 respectively. The MV#1 may be utilized in a subsequent step for determining a confidence metric of the choice of MV#0. The half-pixel positions may be created using two-tap interpolation filters, for example.

The motion compensation (MC) block 622 may comprise suitable logic, circuitry and/or code that may be enabled to generate motion-compensated pixels from a reference image or previous output picture Out(−1), by utilizing the lowest cost half-pel MV or MV#0 generated by the MC block 622.

The filter control block 624 may comprise suitable logic, circuitry and/or code that may be enabled to compare the current input picture In(0) after being converted to the 4:4:4 format at each pixel with the motion compensated result from the ME function using MV#0 on the previous output picture Out(−1), for example. These comparisons may be performed in the 4:4:4 format or alternatively in another format, for example the 4:2:2 format. The comparison may be performed using another measurement window that is similar in principle to the ME window 678. However, the filter control window may have a different size such as 5×3 or 7×5, for example. A cost metric may be generated over the measurement window, using a cost metric that may be similar to the ME cost metric. The filter cost metric may be represented as follows:

$$\text{cost}_{mc\_iir} = (2*\text{luma\_SAD} + \text{abs}(Cb\_\text{SSD}) + \text{abs}(Cr\_\text{SSD}) + 2)/4 \quad (24b)$$

The filter cost may be calculated for each pixel in the input picture In(0), and the ME cost may be calculated using windows of the input picture In(0) that may step by 3 pixels every MV, for example. The window for the filter cost, $\text{cost}_{mc\_iir}$, may be centered at the pixel that is being filtered. The weighting factors in equation (24b) may favor luma more than each chroma as luma may carry more information.

In accordance with an embodiment of the invention, the filter cost window size may be configurable, for example, to be 7×5 or 5×3. The non-MC path filter cost window may also be independently configurable. The MC path and non-MC path filter cost window sizes may be independently configurable.

The filter cost value (filter_cost) may be mapped to filter coefficients of the IIR temporal filter in the MC path by utilizing the following non-linear transfer function:

$$\alpha_{mc\_iir} = K_0(1 - (K_1/d^2)) \quad (25)$$

where d=16*filter_cost/(size of window). The value 16 may be changed and other values may be utilized accordingly, to facilitate fixed point operations. K0 and K1 are parameters that may be set according to the desired degree of filtering corresponding to the noise level of the input video and/or the expectations of a subsequent encoder.

The MC path blending factor including non-linearities may be calculated as follows:

$$m = \frac{16 * cost_{mc\_iir}}{\text{cost\_window\_size\_w} * \text{cost\_window\_size\_h}} \quad (26a)$$

$$\alpha_{mc\_iir} = K_{mc\_iir,0}\left(1 - \frac{K_{mc\_iir,1}}{m^2}\right). \quad (26b)$$

$$\alpha_{mc\_iir} = clip3(\alpha_{mc\_iir}, \text{LOW\_THD}, 256). \quad (26c)$$

where $K_{mc\_iir,0}$ and $K_{mc\_iir,1}$ are parameters that may be set according to the desired degree of filtering corresponding to the noise level of the input video and/or the expectations of a subsequent encoder and the function clip3( ) may be defined as follows:

```
int clip3(int x, int y, int z)
{
    if(x<y) return y;
    else if(x>z) return z;
    else return x;
}
```

Combining equations (24a) and (24b) with equation (26a), the normalized cost for the MC path may be approximated as follows:

$$m >> (b_0*\text{luma\_SAD} + b_1*\text{abs}(Cb\_\text{SSD}) + b_1*\text{abs}(Cr\_\text{SSD})) >> 14 \quad (26d)$$

where $$b_0 = ((16*8192)/(\text{cost\_window\_size\_w}*\text{cost\_window\_size\_h}) \quad (26e)$$

$$b_1 = ((16*4096)/(\text{cost\_window\_size\_w}*\text{cost\_window\_size\_h}) \quad (26f)$$

In the above implementation, b0 and b1 may be configurable unsigned integer values, for example, since the window size may be configurable and may be constrained as follows:

$$b_0 + 2*b_1 = (\text{int})(262144/(\text{cost\_window\_size\_w}*\text{cost\_window\_size\_h})) \quad (26g)$$

The temporal filter 626 may comprise suitable logic, circuitry and/or code that may be enabled to generate a motion compensated output out_mc(0) to the blend block 528. The temporal filter in the MC path may be an IIR filter, for example. The feedback term or the output picture Out(−1) may be the previously generated output from the entire MCTF. The MC temporal filter 626 output may be specified as follows:

$$\text{Out\_mc}(0) = ((\alpha_{MC\_IIR}*\text{In}(0)) + (256 - \alpha_{mc\_IIR})*(mc(0)) + 128)/256 \quad (27)$$

where $\alpha_{MC\_IIR}$ is the output of the filter control block 624, and mc(0) is the output of the motion compensation block 622.

In another embodiment of the invention, the even indexed samples may be filtered although both In(0) and Out(−1) have been converted to the 4:4:4 format for the chroma sample filtering operations. This may lower the cost without any significant impact on visual quality. The temporal filter 626 may be enabled to generate the resulting output in the 4:2:2 format, for example.

Figure 7:
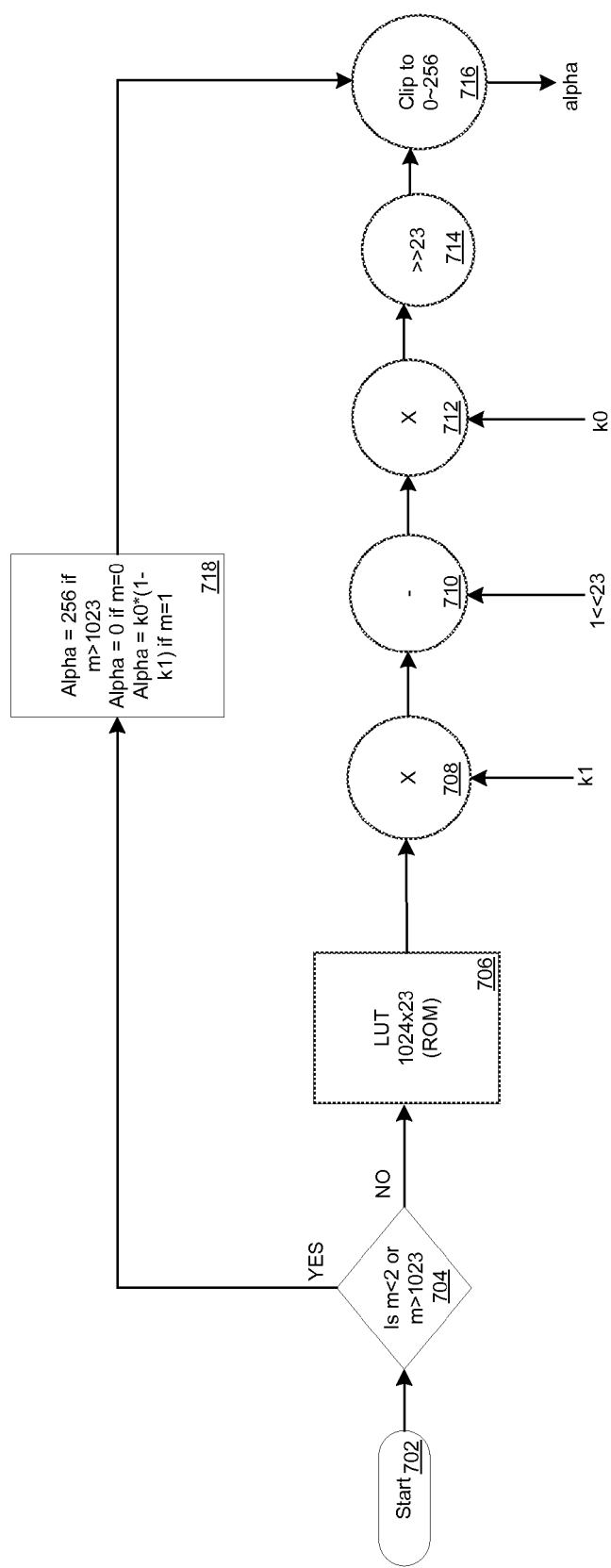
FIG. 7 is a flowchart illustrating an exemplary look-up table (LUT) for non-linearity computation for motion compensated temporal filtering system, in accordance with an embodiment of the invention.

FIG. 7 is a flowchart illustrating an exemplary look-up table (LUT) for non-linearity computation for motion compensated temporal filtering system, in accordance with an embodiment of the invention. Referring to FIG. 7, exemplary steps may begin at step 702. In step 704, it may be determined whether m<2 or m>1023. If m<2 or m>1023, then control passes to step 718. In step 718, the value of the blend control factor alpha may be calculated as follows:

Alpha=256, if m>1023; Alpha=0, if m=0; Alpha=k0*(1−k1), if m=1

Control then passes to step 716.

If m>2 or m<1023, then control passes to step 706. In step 706, a 1024-entry-by-23-bit/entry look-up table (LUT), for example, may be utilized to generate the blending factor values. The LUT may comprise the 23 most significant bits (MSBs) of the fractional part of 1/(m*m). In step 708, the blending factor value may be multiplied by k1. The value of K1 for the MC path filtering may be in the range from 0 to 16383, inclusive, for example. In step 710, the LUT may be indexed by the value of m with m ranging from 2 to 1023, for example. The LUT may be shared in the computation of the three blending factors. In step 712, the blending factor may be multiplied by k0. The value of K0 may be in the range from 268 to 511, inclusive, for example. In step 714, the corresponding entry may be right shifted by 23 bits. In step 716, the resultant blending factor may be clipped between a lower threshold 0, for example, and an upper threshold 256, for example, to generate the blending factor alpha.

In another embodiment of the invention, the horizontal and vertical edge gradients may be calculated and utilized to adjust the blending control to combine the MC path output Out_mc(0) and non MC path output Out_nmc(0). The vertical gradient may be utilized to decrease the confidence level, and the horizontal gradient may offset the effect introduced by the vertical gradient, in order to reduce the flickering effect of near horizontal edges in the combined result. The edge strength calculations may be performed on the difference of the luma components of the current unfiltered picture In(0) and the previous output reference or filtered picture Out(−1).

The vertical gradient or the horizontal edge strength may be calculated by applying a plurality of filter templates to a neighborhood of the luma component of the difference between the current input picture In(0) and the previous output picture Out(−1), centered at the center pixel of a 3×1 pixel block, for example. The gradient may be calculated once for each 3×1 pixel block, for example. The plurality of filter templates may be as follows:

$$\begin{pmatrix} 1 & 1 & 1 & 2 & 1 & 1 & 1 \\ -1 & -1 & -1 & -2 & -1 & -1 & -1 \\ 0 & 0 & 0 & 0 & 0 & 0 & 0 \end{pmatrix} \text{ and}$$

$$\begin{pmatrix} 0 & 0 & 0 & 0 & 0 & 0 & 0 \\ 1 & 1 & 1 & 2 & 1 & 1 & 1 \\ -1 & -1 & -1 & -2 & -1 & -1 & -1 \end{pmatrix}$$

The horizontal edge strength may be calculated as follows:

h_edge_diff=max(abs(temp1),abs(temp2))/2 where temp1 and temp2 are the output values generated by applying the plurality of filter templates to a neighborhood of the luma component of the difference between the current input picture In(0) and the previous output picture Out(−1).

The horizontal gradient or the vertical edge strength may be calculated by applying the following two templates to the neighborhood of the luma difference between the current input picture In(0) and the previous output picture Out(−1), centered at the center pixel of the 3×1 pixel block, for example. The plurality of filter templates may be as follows:

$$\begin{pmatrix} 1 & 1 & -1 & -1 & 0 \\ 2 & 2 & -2 & -2 & 0 \\ 1 & 1 & -1 & -1 & 0 \end{pmatrix} \text{ and } \begin{pmatrix} 0 & 1 & 1 & -1 & -1 \\ 0 & 2 & 2 & -2 & -2 \\ 0 & 1 & 1 & -1 & -1 \end{pmatrix}$$

The vertical edge strength may be calculated as follows:

v_edge_diff=max(abs(temp3),abs(temp4))/2 where temp3 and temp4 are the output values generated by applying the plurality of filter templates to a neighborhood of the luma component of the difference between the current input picture In(0) and the previous output picture Out(−1). The final value of the edge strength that is utilized to adjust the confidence level may be calculated as follows:

edge_strength_adj=max(0,h_edge_diff-v_edge_diff)

In accordance with an embodiment of the invention, the memory bandwidth, silicon area of the memory 526 and logic required for the motion estimation block 620 may be minimized. The memory 526 bandwidth requirement may be higher if the non-MC path utilized a combined FIR and IIR mode while the MC path is also enabled. The MC path may utilize a previous final output Out(−1) for ME/MC instead of a previous unfiltered input picture In(−1), which may reduce the memory 526 bandwidth from about 7 pictures to about 2 pictures, for example, of memory 526 access for each input picture. The silicon area associated with the ME block 620 may be minimized by using horizontal-only motion estimation and compensation (H-only) and by using a pixel block size of 3×1, for example, where the MV's are calculated every 3 pixels, for example, and by filtering the chroma samples in the 4:2:2 format.

Figure 8:
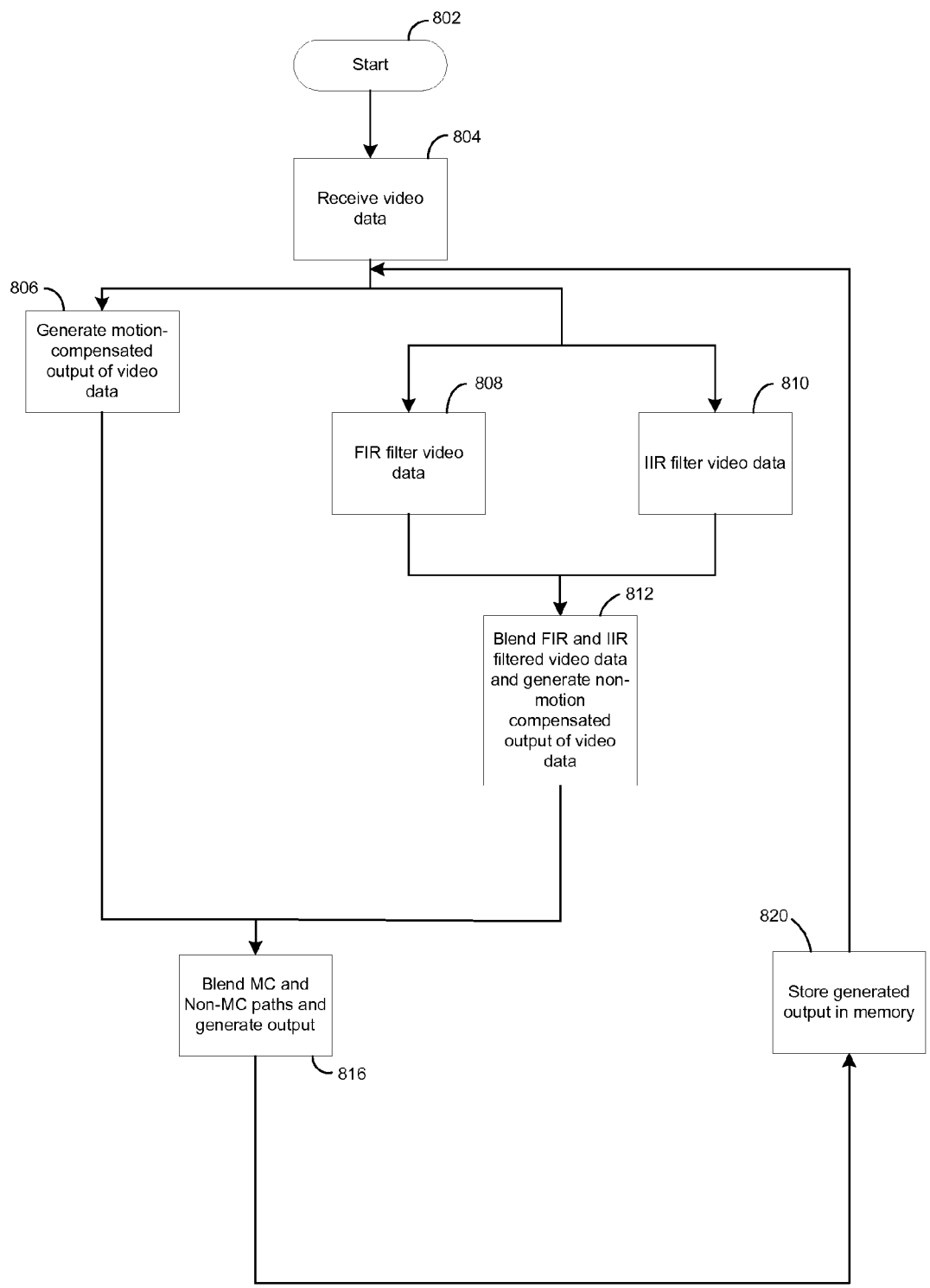
FIG. 8 is a flowchart illustrating exemplary steps for motion compensated temporal filtering system using both finite impulse response (FIR) and infinite impulse response (IIR) filtering, in accordance with an embodiment of the invention.

FIG. 8 is a flowchart illustrating exemplary steps for motion compensated temporal filtering system using both finite impulse response (FIR) and infinite impulse response (IIR) filtering, in accordance with an embodiment of the invention. Referring to FIG. 8, exemplary steps may begin at step 802. In step 804, the MCTF system may be enabled to receive and decode the video data. In step 806, the MC filter block 522 may be enabled to generate a motion compensated output picture of video data (Out_mc(0)). In step 808, the FIR-NR block 604 may be enabled to generate at least one finite impulse response (FIR) filtered output picture (FIR_out (0)) of video data. In step 810, the IIR-NR block 606 may be enabled to generate at least one infinite impulse response (IIR) filtered output picture (IIR_out(0)) of video data. In step 812, the IIR/FIR blending block 610 may be enabled to blend at least one FIR filtered output picture (FIR_out(0)) of video data and at least one IIR filtered output picture of video data (IIR_out(0)) and generate at least one blended non-motion compensated output picture of video data (Out_nmc(0)).

In step 816, the blend block 528 may enable combining of at least one generated motion compensated output picture of video data (Out_mc(0)) and the generated at least one blended non-motion compensated output picture of video data (Out_nmc(0)) and generate at least one output picture of video data (Out(0)). In step 820, a previously generated portion of the generated output picture of video data (Out(−1)) may be fed back to the MC filter 522 and the Non-MC filter 524.

In accordance with an embodiment of the invention, a method and system for motion compensated temporal filtering using both finite impulse response (FIR) and infinite impulse response (IIR) filtering may comprise at least one circuit, for example, an IIR/FIR blending block 610 that enables blending of at least one finite impulse response (FIR) filtered output picture (FIR_out(0)) of video data and at least one infinite impulse response (IIR) filtered output picture of video data (IIR_out(0)) to generate at least one blended non-motion compensated output picture of video data (Out_nmc (0)).

The MC filter module 650 may enable generating at least one motion compensated picture of video data (mc(0)), utilizing at least one previously generated output picture of video data (Out(−1)) and at least one current input picture of video data (In(0)). The MC filter module 650 may enable blending of the generated at least one motion compensated picture of video data (mc(0)) and at least one current input picture of video data (In(0)) to generate at least one motion compensated output picture of video data (Out_mc(0)). The blend block 528 may enable combining of at least one generated motion compensated output picture of video data (Out_mc(0)) and the generated blended non-motion compensated output picture of video data (Out_nmc(0)). At least one current output picture of video data (Out(0)) may be generated by utilizing the blended generated motion compensated output picture of video data (Out_mc(0)) and the generated blended non-motion compensated output picture of video data (Out_nmc(0)).

The MC filter block 522 may enable utilization of the previously generated portion of the output picture of video data (Out(−1)) to determine at least one motion vector (MV) to represent a motion of the video data based on a cost metric of at least one input picture of the video data (In(−1)). The motion compensated output picture of video data (Out_mc(0)) may be generated by determining a confidence metric of the determined motion vector to represent the motion of video data.

The blend calculation block 530 may be enabled to estimate the confidence metric of MV#0 by utilizing a combination of three metrics, for example, a first metric (cost_MV#1−cost_MV#0), which indicates how much better MV#0 is than the next lowest cost MV, a second metric (cost_zero_MV−cost_MV#0), which indicates how much better MV#0 is compared to the zero (0,0) vector, and a third metric may be the horizontal edge strength, edge_strength_adj. These metrics may be combined as follows:

$$\text{confidence\_}mv=\max((\text{cost\_zero\_}MV-\text{cost\_}MV\#0),\\ (\text{cost\_}MV\#1-\text{cost\_}MV\#0)) \quad (11a)$$

$$\text{confidence}=\max(0,\text{confidence\_}mv-\text{edge\_strength\_adj}) \quad (11b)$$

The motion compensated output picture of video data (Out_mc(0)) may be generated by temporal filtering of video data with the determined motion vector (MV). The temporal filter in the MC path may be an IIR filter, for example. The feedback term or the output picture Out(−1) may be the previously generated output from the entire MCTF. The MC temporal filter 626 output may be specified as follows:

$$\text{Out\_}mc(0)=((\alpha_{MC\_IIR}*\text{In}(0))+(256-\alpha_{MC\_IIR})*\\ (mc(0))+128)/256 \quad (27)$$

where $\alpha_{MC\_IIR}$ is the output of the filter control block 624, and mc(0) is the output of the motion compensation block 622.

The cost metric may comprise a combination of a sum of absolute differences (SAD) for luma components of video data and an absolute value of a sum of signed differences (SSD) for chroma components of video data. A cost metric may be generated over the measurement window, using a cost metric that may be similar to the ME cost metric. The filter cost metric may be represented as follows:

$$\text{cost}_{mc\_iir}=(2*\text{luma\_SAD}+\text{abs}(Cb\_\text{SSD})+\text{abs}\\ (Cr\_\text{SSD})+2)/4 \quad (24b)$$

The filter cost may be calculated for each pixel in the input image In(0), and the ME cost may be calculated using windows of the input picture that may step by 3 pixels every MV, for example.

The motion vector (MV) may be determined based on a lowest cost of at least one input picture of video data (In(0)). The motion estimation (ME) block 620 may be enabled to search a previous MCTF output picture out(−1) in the search range 676 to find a motion vector (MV) with a suitable fit, for example, lowest cost, with respect to a current input picture In(0).

The generated at least one current output picture of video data (Out(0)) may be fed back for generating at least one subsequent output picture of video data. The previously generated portion of the output picture of video data (Out(−1)) may be fed back to the non-MC filter block 524 for generating at least one blended non-motion compensated output picture of said video data.

The previously generated portion of the output picture of video data (Out(−1)) may be fed back to the MC filter block 522 to determine the generated motion compensated output picture of video data (Out_mc(0)). A blending factor, $\alpha_{blend}$ may be determined for blending the generated motion compensated output picture of video data (Out_mc(0)) and the generated blended non-motion compensated output picture of video data (Out_nmc(0)). A horizontal edge gradient and/or a vertical edge gradient may be calculated to adjust the determined blending factor $\alpha_{blend}$. The vertical gradient may be utilized to decrease the confidence level, and the horizontal gradient may offset the effect introduced by the vertical gradient, in order to reduce the flickering effect of near horizontal edges in the combined result.

At least one FIR filtered output picture of video data (FIR_out(0)) may be generated based on a FIR blending factor $\alpha_{fir}$. The FIR blending factor $\alpha_{fir}$ may be dynamically modified based on a motion metric parameter. At least one IIR filtered output picture of video data (IIR_out(0) may be generated based on an IIR blending factor $\alpha_{iir}$. The IIR blending factor $\alpha_{iir}$ may be dynamically modified based on a motion metric parameter.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling video data, the method comprising:

performing a filtering operation with noise reduction on a current pixel in a video picture based on a selected filtering mode of operation, wherein the filtering mode of operation is selectable from a plurality of modes comprising a finite impulse response (FIR) filtering with noise reduction mode, an infinite impulse response (IIR) with noise reduction mode, and an FIR-IIR blended filtering with noise reduction mode, and generating blending factors to be utilized with a selected filtering mode of operation, wherein the FIR-IIR blended filtering with noise reduction mode of operation comprises:

generating at least one blended non-motion compensated output picture of said video data based on blending at least one finite impulse response (FIR) filtered output picture of said video data and at least one infinite impulse response (IIR) filtered output picture of said video data;

blending at least one motion compensated output picture of said video data and said at least one blended non-motion compensated output picture of said video data; and generating at least one current output picture of said video data based on said blending of said at least one motion compensated output picture of said video data and said at least one blended non-motion compensated output picture of said video data.

2. The method according to claim 1, comprising: generating said at least one FIR filtered output picture of said video data based on a FIR blending factor; and generating said at least one IIR filtered output picture of said video data based on an IIR blending factor.

3. The method according to claim 2, comprising dynamically modifying one or both of: said FIR blending factor or said IIR blending factor based on a motion metric parameter.

4. The method according to claim 1, comprising generating said at least one motion compensated output picture of said video data based on blending at least one motion compensated picture of said video data and at least one current input picture of said video data.

5. The method according to claim 4, comprising generating said at least one motion compensated picture of said video data by utilizing at least one previously generated output picture of said video data and said at least one current input picture of said video data.

6. The method according to claim 5, comprising determining at least one motion vector based on a cost metric to represent a motion of said video data by utilizing said at least one previously generated output picture of said video data.

7. The method according to claim 6, wherein said cost metric comprises a combination of a sum of absolute differences for luma components of said video data and an absolute value of a sum of signed differences for chroma components of said video data.

8. The method according to claim 1, comprising determining a blending factor for blending said at least one motion compensated output picture of said video data and said at least one blended non-motion compensated output picture of said video data.

9. The method according to claim 8, comprising calculating one or both of: a horizontal edge gradient or a vertical edge gradient to adjust said determined blending factor.

10. A system for handling video data, the system comprising:

one or more circuits being operable to perform a filtering operation with noise reduction on a current pixel in a video picture based on a selected filtering mode of operation, wherein the filtering mode of operation is selectable from a plurality of modes comprising a finite impulse response (FIR) filtering with noise reduction mode, an infinite impulse response (IIR) with noise reduction mode, and an FIR-IIR blended filtering with noise reduction mode, and said one or more circuits are operable to generate blending factors to be utilized with a selected filtering mode of operation, wherein the FIR-IIR blended filtering with noise reduction mode of operation comprises:

said one or more circuits generating at least one blended non-motion compensated output picture of said video data based on blending at least one finite impulse response (FIR) filtered output picture of said video data and at least one infinite impulse response (IIR) filtered output picture of said video data;

said one or more circuits blending at least one motion compensated output picture of said video data and at least one blended non-motion compensated output picture of said video data; and said one or more circuits generating at least one current output picture of said video data based on said blending of said at least one motion compensated output picture of said video data and said at least one blended non-motion compensated output picture of said video data.

11. The system according to claim 10, wherein said one or more circuits are operable to: generate said at least one FIR filtered output picture of said video data based on a FIR blending factor; and generate said at least one IIR filtered output picture of said video data based on an IIR blending factor.

12. The system according to claim 11, wherein said one or more circuits are operable to dynamically modify one or both of: said FIR blending factor and/or said IIR blending factor based on a motion metric parameter.

13. The system according to claim 10, wherein said one or more circuits are operable to generate said at least one motion compensated output picture of said video data based on blending at least one motion compensated picture of said video data and at least one current input picture of said video data.

14. The system according to claim 13, wherein said one or more circuits are operable to generate said at least one motion compensated picture of said video data by utilizing at least one previously generated output picture of said video data and said at least one current input picture of said video data.

15. The system according to claim 14, wherein said one or more circuits are operable to determine at least one motion vector based on a cost metric to represent a motion of said video data by utilizing said at least one previously generated output picture of said video data.

16. The system according to claim 15, wherein said cost metric comprises a combination of a sum of absolute differences for luma components of said video data and an absolute value of a sum of signed differences for chroma components of said video data.

17. The system according to claim 10, wherein said one or more circuits are operable to determine a blending factor for blending said at least one motion compensated output picture of said video data and said at least one blended non-motion compensated output picture of said video data.

18. The system according to claim 17, wherein said one or more circuits are operable to calculate one or both of: a horizontal edge gradient or a vertical edge gradient to adjust said determined blending factor.

19. A computer readable medium having executable instructions, when executed by a processor, cause the processor to:

perform a filtering operation with noise reduction on a current pixel in a video picture based on a selected filtering mode of operation, wherein the filtering mode of operation is selectable from a plurality of modes comprising a finite impulse response (FIR) filtering with noise reduction mode, an infinite impulse response (IIR) with noise reduction mode, and an FIR-IIR blended filtering with noise reduction mode, and generate blending factors to be utilized with a selected filtering mode of operation, wherein the FIR-IIR blended filtering with noise reduction mode of operation comprises:

generating at least one blended non-motion compensated output picture of said video data based on blending at least one finite impulse response (FIR) filtered output picture of said video data and at least one infinite impulse response (IIR) filtered output picture of said video data;

blending at least one motion compensated output picture of said video data and said at least one blended non-motion compensated output picture of said video data; and generating at least one current output picture of said video data based on said blending of said at least one motion compensated output picture of said video data and said at least one blended non-motion compensated output picture of said video data.

20. The computer readable medium of claim 19, the instructions further causing the processor to generate said at least one FIR filtered output picture of said video data based on a FIR blending factor; and generate said at least one IIR filtered output picture of said video data based on an IIR blending factor.

* * * * *